United States Patent
Mohamed et al.

(10) Patent No.: US 12,116,289 B1
(45) Date of Patent: Oct. 15, 2024

(54) MESOPOROUS ZINC OXIDE GRAPHITE COMPOSITE

(71) Applicant: Imam Abdulrahman Bin Faisal University, Dammam (SA)

(72) Inventors: Hanan Hussein Amin Mohamed, Dammam (SA); Aamerah Abdulwahab Alsanea, Dammam (SA); Nuhad Abdullah Alomair, Dammam (SA); Sultan Akhtar, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 18/740,572

(22) Filed: Jun. 12, 2024

Related U.S. Application Data

(60) Continuation of application No. 17/513,258, filed on Oct. 28, 2021, now Pat. No. 12,043,554, which is a
(Continued)

(51) Int. Cl.
*C01G 9/02* (2006.01)
*B01J 21/18* (2006.01)
(Continued)

(52) U.S. Cl.
CPC ............... *C01G 9/02* (2013.01); *B01J 21/18* (2013.01); *B01J 23/06* (2013.01); *B01J 35/39* (2024.01);
(Continued)

(58) Field of Classification Search
None
See application file for complete search history.

(56) References Cited

FOREIGN PATENT DOCUMENTS

| CA | 2 720 606 | 12/2009 |
|---|---|---|
| CN | 102774822 A | 11/2012 |

(Continued)

OTHER PUBLICATIONS

Mallakpour, et al. ; Recycled PET/MWCNT-ZnO quantum dot nanocomposites: Adsorption of Cd(II) ion, morphology, thermal and electrical conductivity properties ; Chemical Engineering Journal vol. 313 ; pp. 873-881 ; Oct. 31, 2016 ; Abstract Only ; 2 Pages.

(Continued)

*Primary Examiner* — Coris Fung
*Assistant Examiner* — Keling Zhang
(74) *Attorney, Agent, or Firm* — Oblon, McClelland, Maier & Neustadt, L.L.P.

(57) ABSTRACT

High surface area 3D mesoporous carbon nanocomposites can be derived from Zn dust and PET bottle mixed waste with a high surface area. Simultaneous transformation of Zn metal into ZnO nanoparticles and PET bottle waste to porous carbon materials can be achieved by thermal treatment at preferably 600 to 800° C., and reaction times of from 15 to 60 minutes, after optionally de-aerating the reaction mixtures with $N_2$ gas. The waste-based carbon materials can have surface areas of 650 to 725 $m^2/g$, e.g., 684.5 $m^2/g$ and pore size distributions of 12 to 18 nm. The carbon materials may have 3D porous dense layers with a gradient pore structure, which may have enhanced photocatalytic performance for degrading, e.g., organic dyes, such as methylene blue and malachite green. Sustainable methods make ZnO-mesoporous carbon materials from waste for applications including photocatalysis, upcycling mixed waste materials.

4 Claims, 28 Drawing Sheets

Related U.S. Application Data division of application No. 16/400,358, filed on May 1, 2019, now Pat. No. 11,192,795.

(51) Int. Cl.

| | |
|---|---|
| *B01J 23/06* | (2006.01) |
| *B01J 35/39* | (2024.01) |
| *B01J 37/08* | (2006.01) |
| *B29B 17/02* | (2006.01) |
| *B29B 17/04* | (2006.01) |
| *C01B 32/21* | (2017.01) |

(52) U.S. Cl.
CPC .............. *B01J 37/084* (2013.01); *B29B 17/02* (2013.01); *B29B 17/04* (2013.01); *C01B 32/21* (2017.08); *B29B 2017/0268* (2013.01); *B29B 2017/0496* (2013.01); *C01P 2002/72* (2013.01); *C01P 2002/82* (2013.01); *C01P 2004/03* (2013.01); *C01P 2004/04* (2013.01); *C01P 2004/64* (2013.01); *C01P 2006/12* (2013.01); *C01P 2006/16* (2013.01)

(56) References Cited

FOREIGN PATENT DOCUMENTS

| CN | 103420410 B | 1/2015 |
|---|---|---|
| CN | 103623775 B | 12/2015 |
| CN | 106373992 A | 2/2017 |
| CN | 106542516 B | 12/2018 |
| JP | 04565259 B2 | 8/2010 |

OTHER PUBLICATIONS

Terakado, et al. ; Effect of metal oxides on the pyrolysis residues of poly(ethylene terephthalate): Formation of carbonaceous submicron, nanoscale filaments and mesoporous compounds ; Journal of Analytical and Applied Pyrolysis vol. 73, Issue 2 ; pp. 248-256 ; Mar. 13, 2005 ; Abstract Only ; 1 Page.

Essawy, et al. ; Green synthesis of graphene from recycled PET bottle wastes for use in the adsorption of dyes in aqueous solution ; Ecotoxicology and Environmental Safety 145 ; pp. 57-68 ; 2017 ; 13 Pages.

Sandoval, et al. ; Photocatalytic Degradation of Azo Dyes Over Semiconductors Supported on Polyethylene Terephyhalate and Polystyrene Substrates ; Journal of Advanced Oxidation Technologies 20 (2) : 2017 : 19 Pages.

Hossain et al., Synthesis of an efficient white-light photocatalyst composite of graphene and ZnO nanoparticles: Application to methylene blue dye decomposition, Applied Surface Science, 2015, 354, 55-65 (Year: 2015).

Zhou et al., A general and scalable synthesis approach to porous graphene, Nature Communications, 2014 (Year: 2014).

Chaudhary et al., An overview of ordered mesoporous material SBA-15: synthesis, functionalization and application in oxidation reactions, J. Porous Mater., 2017 (Year: 2017).

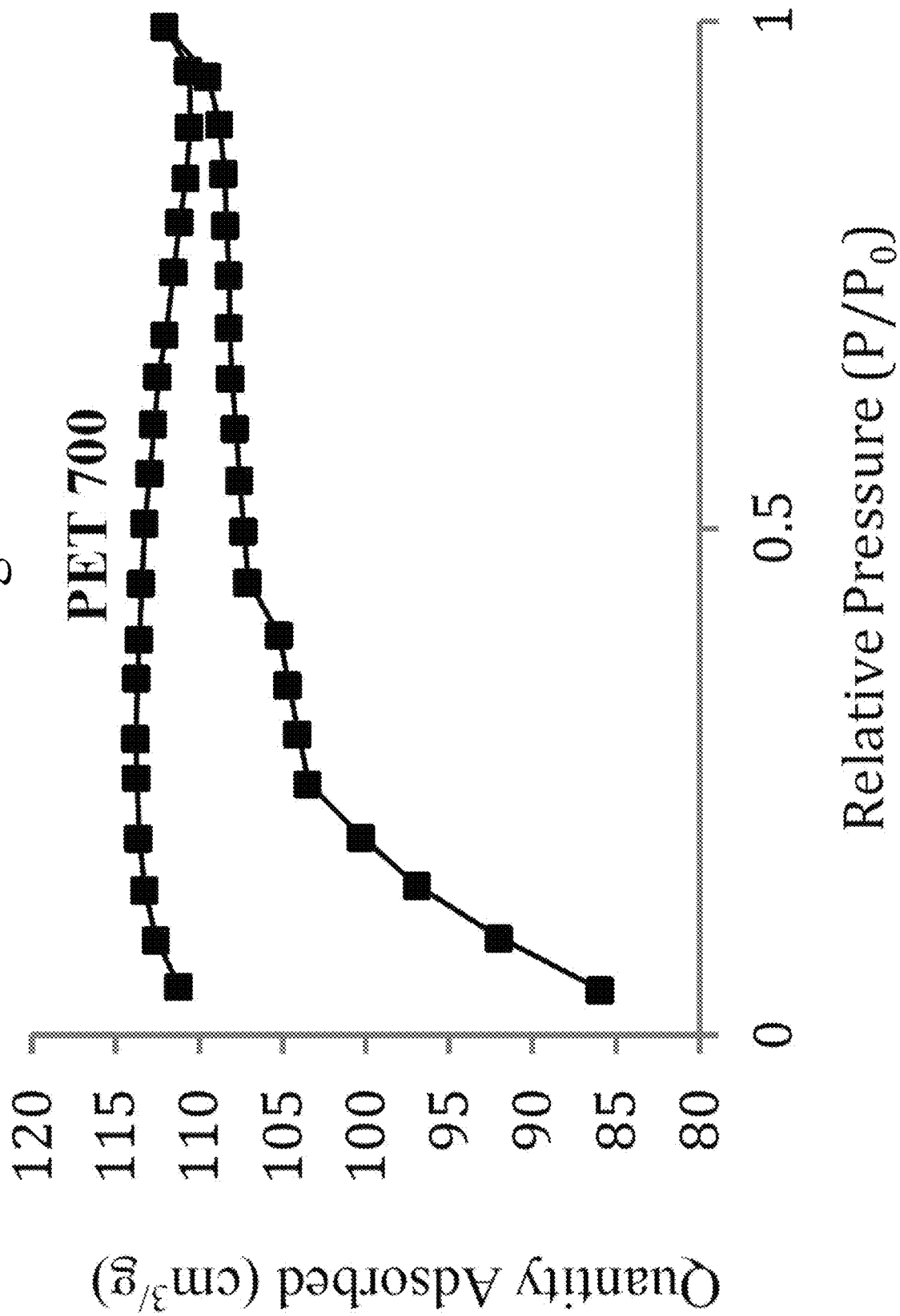

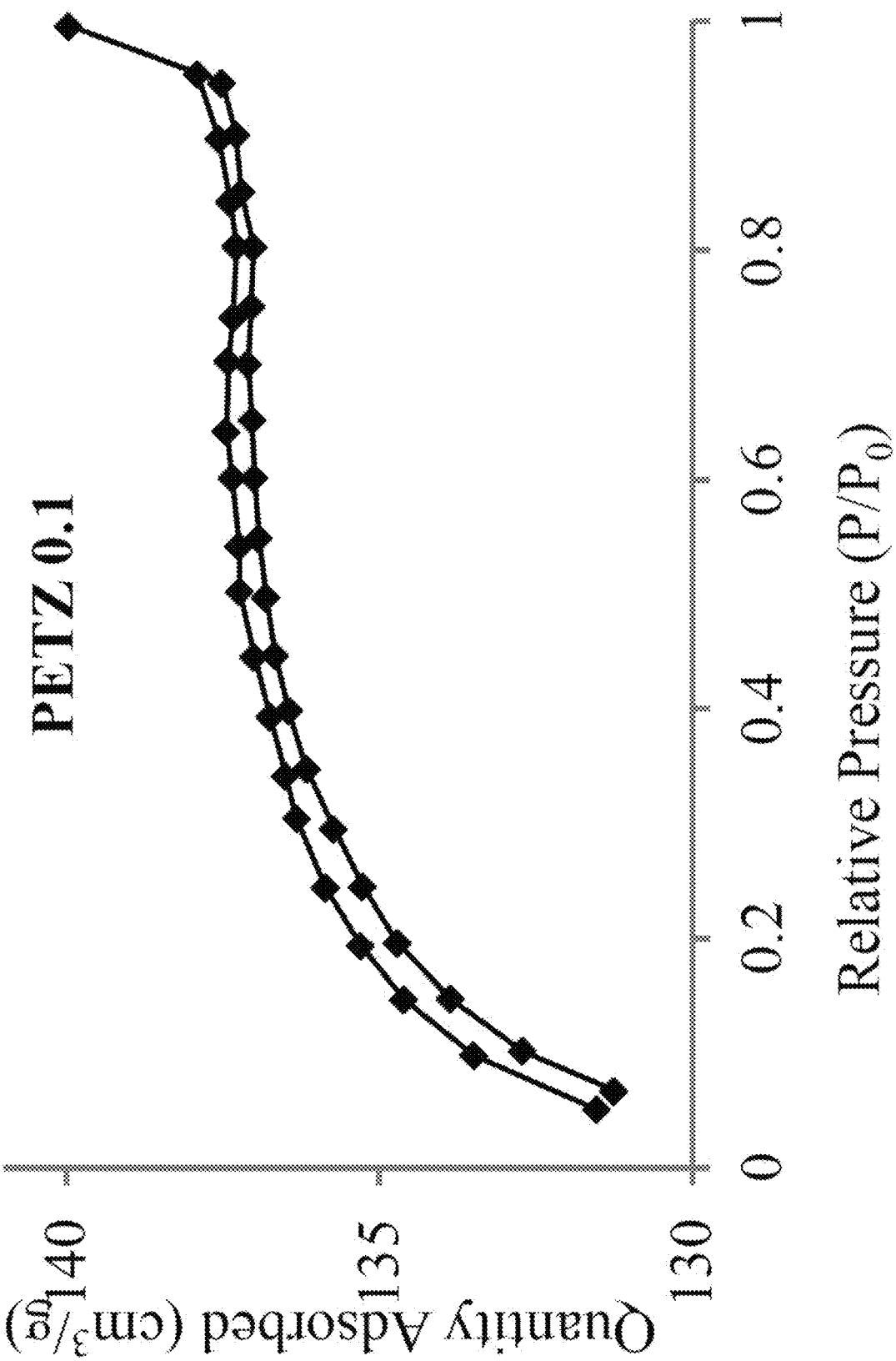
Fig. 7B PETZ 0.1

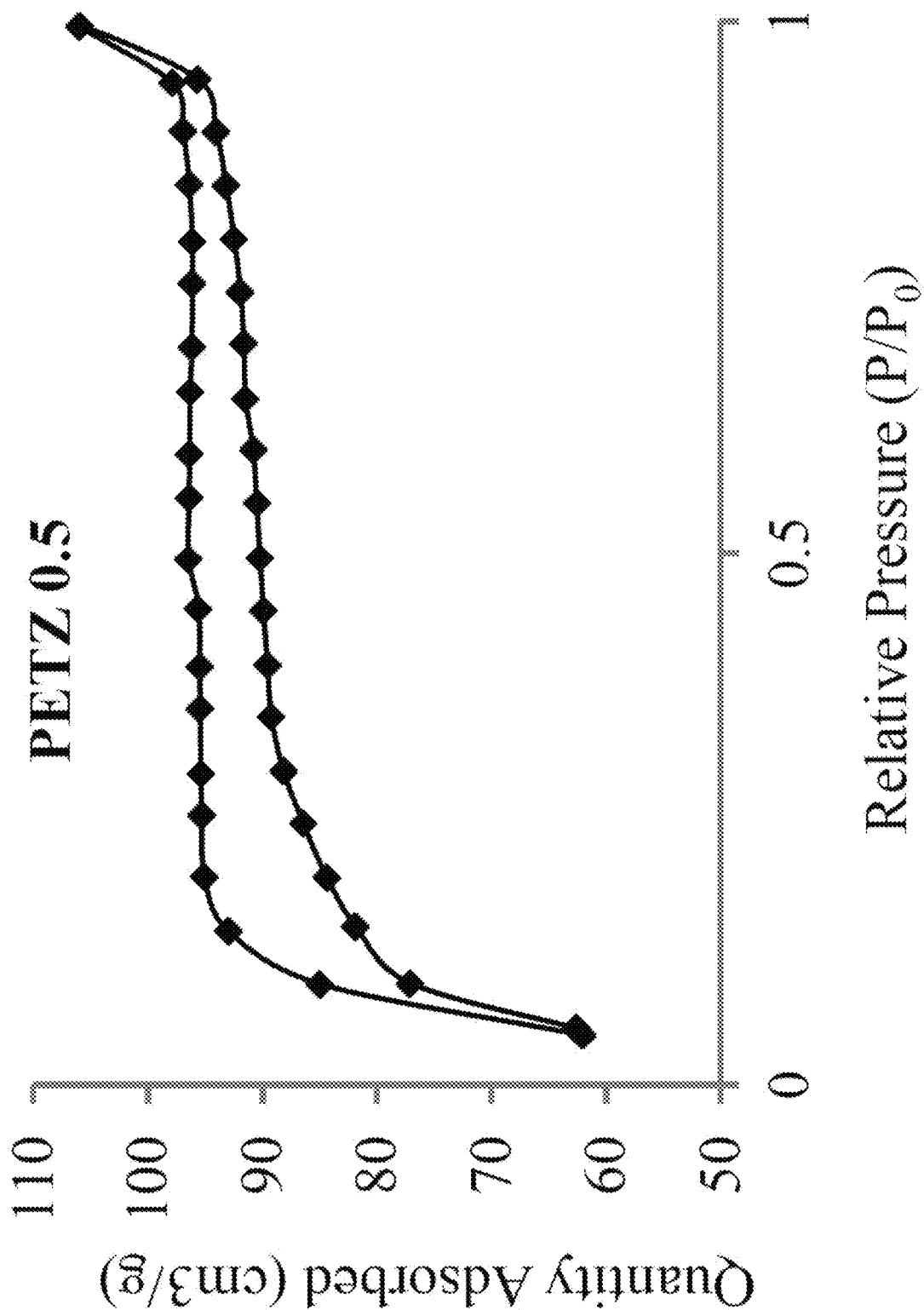
Fig. 7C PETZ 0.5

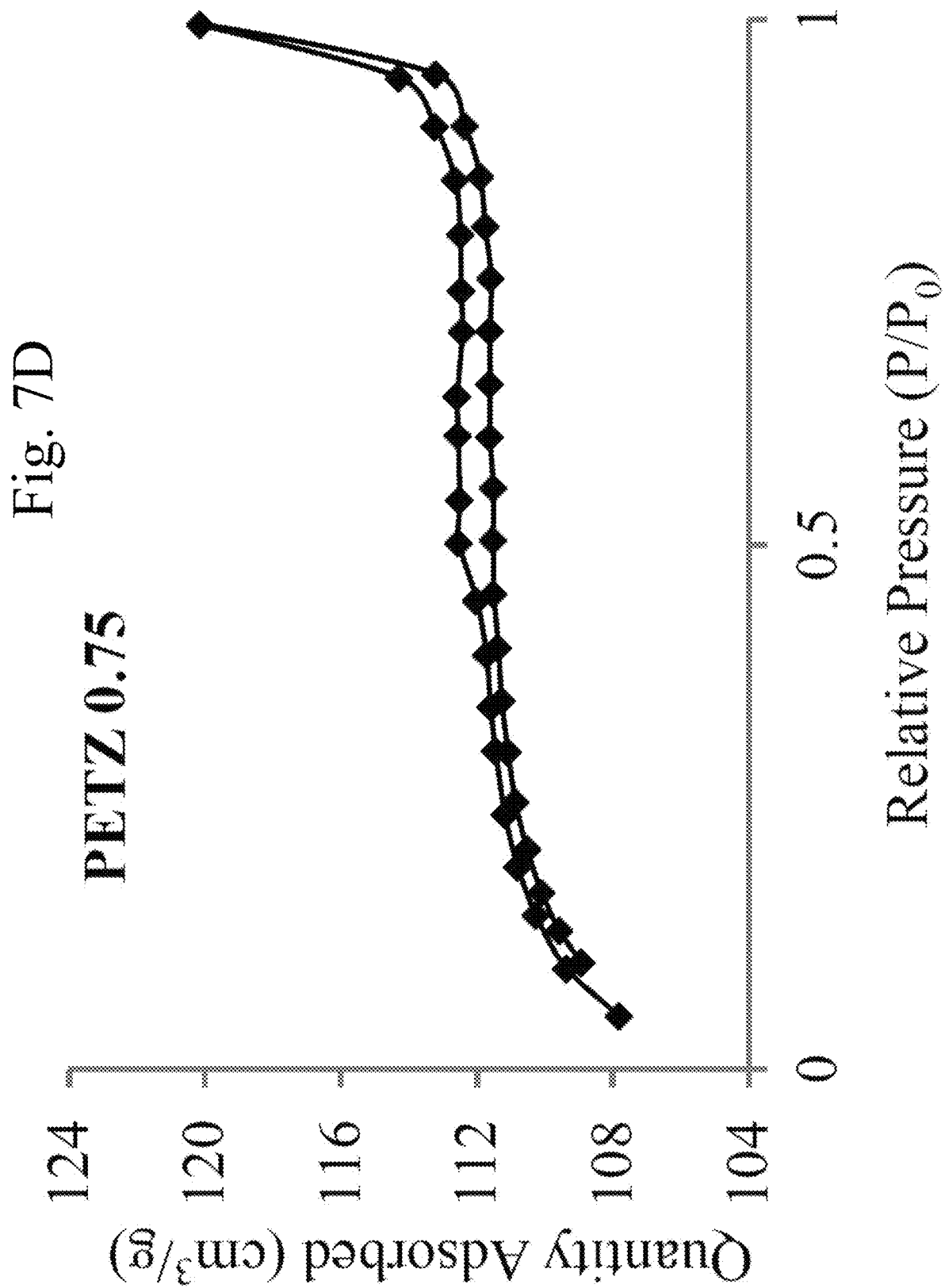

PETZ 1.0

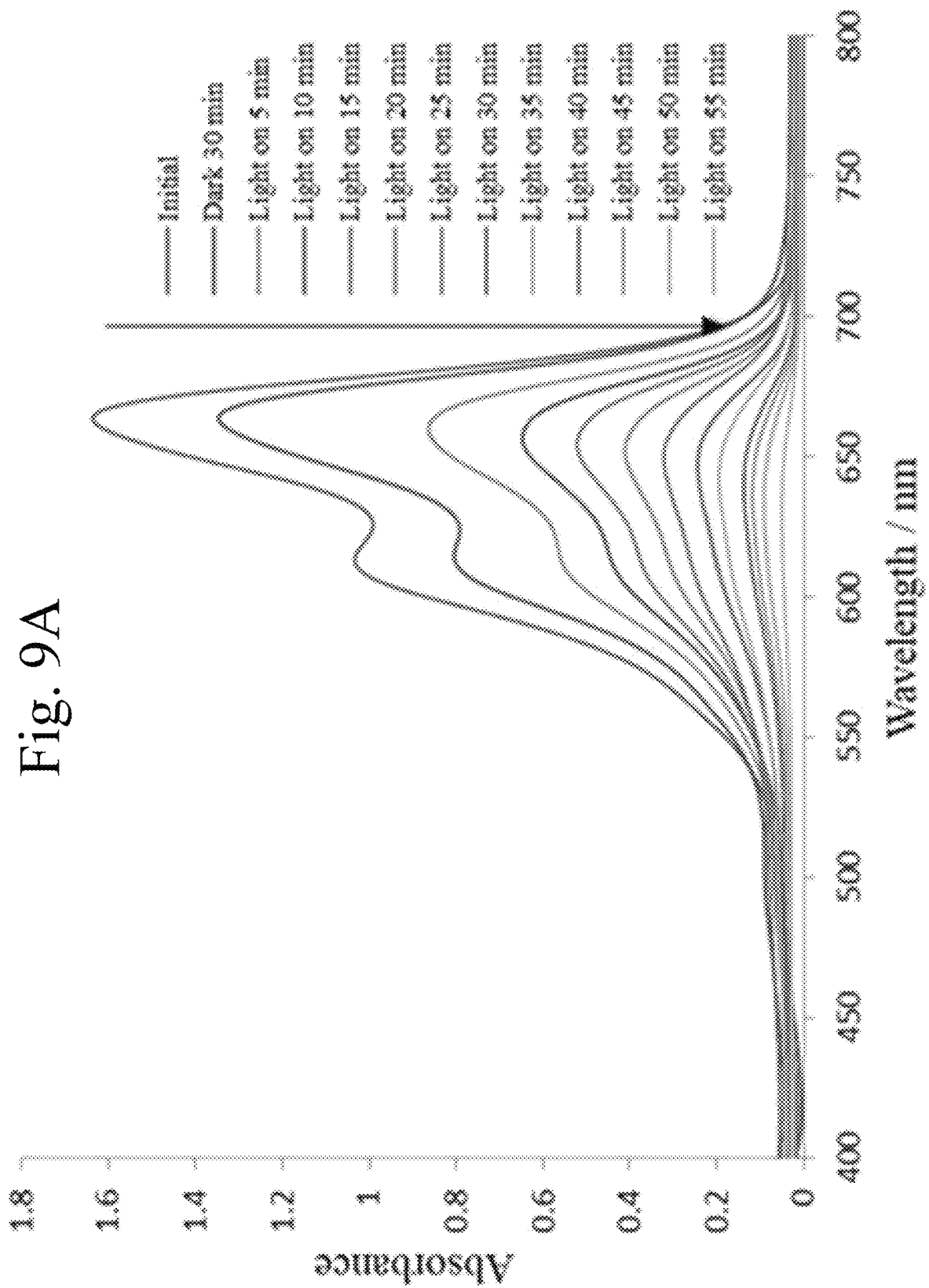

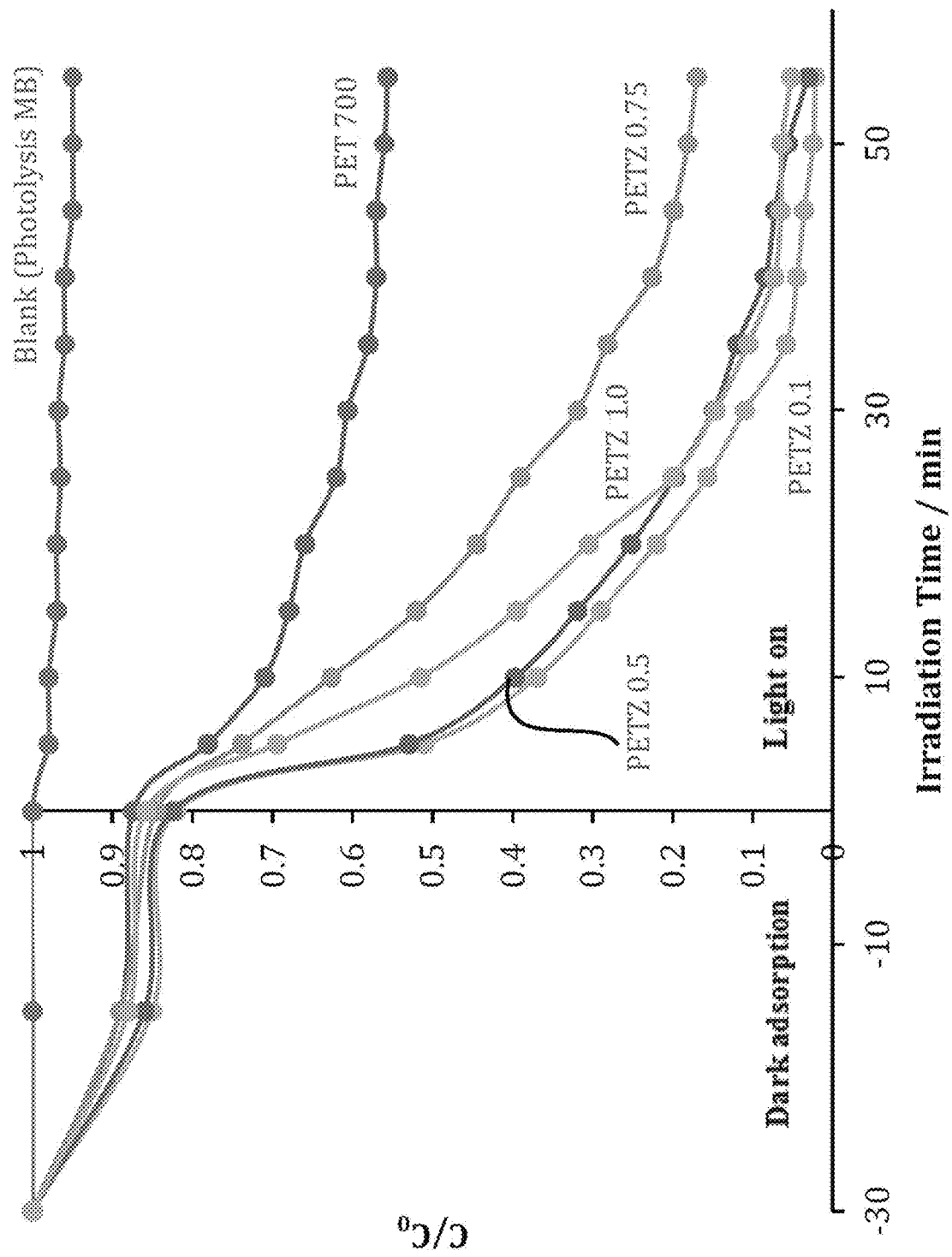

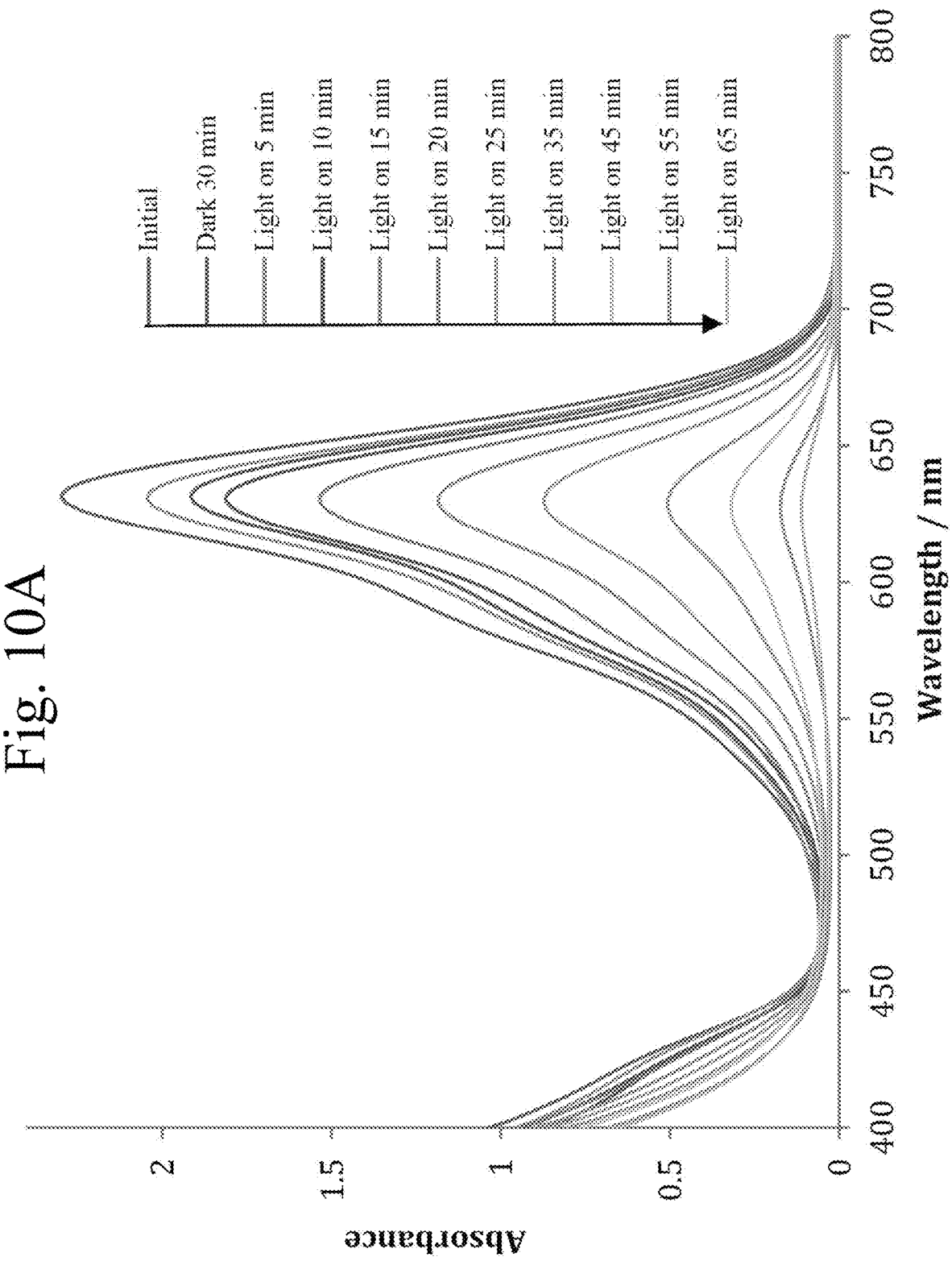

MESOPOROUS ZINC OXIDE GRAPHITE COMPOSITE

CROSS-REFERENCE TO RELATED APPLICATIONS

The present application is a Continuation of U.S. application Ser. No. 17/513,258, now allowed, having a filing date of Oct. 28, 2021 which is a Division of U.S. application Ser. No. 16/400,358, now U.S. Pat. No. 11,192,795, having a filing date of May 1, 2019.

STATEMENT OF ACKNOWLEDGEMENT

The inventors gratefully acknowledge the research units at College of Science, Imam Abdulrahman Bin Faisal University, Dammam, Saudi Arabia, and the financial support of the Deanship of Scientific Research of Imam Abdulrahman Bin Faisal University, Saudi Arabia (Grant Nos. 2016-074-Sci).

STATEMENT REGARDING PRIOR DISCLOSURES BY INVENTOR(S)

Aspects of the present disclosure are described in "ZnO@ Porous Graphite Nanocomposite from Waste for Superior Photocatalytic Activity," which was authored by the inventors and published online in *Environ. Sci. Pollut. Res.* 2019, DOI 10.1007/s11356-019-04684-3 (ISSN 0944-1344), on Mar. 6, 2019, which is incorporated herein by reference in its entirety.

BACKGROUND OF THE INVENTION

Field of the Invention

The present disclosure relates to metal oxide-graphite composites, particularly ZnO-graphite composites, and their application in the degradation of organic matter, particularly in water, such as organic and/or organometallic dye, waste, and/or other contaminant material, as well as method of making such composites, particularly by upcycling plastic waste.

Description of the Related Art

Upcycling can convert waste into value added products as well as reduce waste disposal problems. Upcycling has gained importance considering recent increases in use of plastic products around the world. The preparation of valuable materials from plastic waste would be a significant benefit both from economic and environmental points of view. Plastic production has increased markedly over the last decades, leading to pressing disposal needs and environmental problems. Recently, extensive research has been made into upcycling plastic waste into high value-added carbon nanomaterials. Since plastic waste is mainly composed of carbon, such waste can be converted into carbon-based value-added products such as light hydrocarbons, activated carbon, fullerenes, carbon nanotubes, graphite, and graphene.

Amongst current technologies to upcycle plastic waste materials, energy recovery such as thermal and catalytic pyrolysis, gasification, and plasma arc gasification have attracted much attention. Pyrolysis converts plastic waste into liquid oil, solid residues, and gases at elevated temperatures, e.g., 300 to 900° C., via thermal decomposition.

Metals are ubiquitous materials linked with industrial development and improved living standards, which are used in industrial applications such as mining, construction, and manufacture of automobiles, airplanes, ships, and railways, as well as domestic manufactured items. Metal waste can be discharged into the environment in wastewater, spent solution, and solid waste which can cause serious problems for the human health and living organisms. Among metal waste, zinc is listed by the US Environmental Protection Agency as one of the 129 priority pollutants. In humans, prolonged excessive exposure to zinc can lead to deficiencies in iron and copper, nausea and abdominal pain. Efficient methods would be useful to upcycle such metal waste into useful materials. Among the available methods for metal recovery are hydrometallurgical methods, liquid-liquid extraction, ion exchange, and electrochemical separations. Since zinc oxide (nano) particles have wide applications, e.g., in cell batteries, antibacterial activity, and in photocatalysis, converting Zn metal waste to useful ZnO would be beneficial.

The recovery of metallic zinc from galvanizing plant waste to produce high purity ZnO by oxidizing zinc vapor in oxygen atmosphere has received substantial attention. In such processes, galvanizing plant waste (zinc dross) can be mixed with a reducing agent, e.g., coke, activated carbon, etc., and heated to vaporize zinc.

Upcycling separated waste, including converting plastic wastes into high-value-added carbon nanomaterials or converting metal wastes into useful metal oxide, have likewise attracted research attention. However, upcycling metal-plastic mixed waste has enjoyed only limited study. Plastic and metal waste can exist together in several manufactures, such as electronic waste, medical waste, batteries, accumulators, and end-of-life vehicles. Therefore, upcycling plastic-metal mixed waste has been a concern for both governments and private citizens, due to perils to human life and the environment, due to toxicity and other hazards. Thus, simultaneous upcycling of plastic and metal wastes would be of interest.

2D $sp^2$ carbon nanosheet composite materials have found interest due to their unique optical, electrical, and mechanical properties. Such 2D materials have been applied in the field of electrochemistry, for example, in lithium ion batteries, photocatalysis, and biological agents. However, 2D $sp^2$ graphite nanosheets tend to aggregate by Van der Waals and π-π interaction, which limit their practical use. Therefore, 3D porous graphite macrostructures have been researched to provide a network structure with sufficient interface areas and conductivities. Some of these efforts are set forth in the references below.

CN 103623775 B by Yu et al. (Yu) discloses a ZnO nano-mesoporous carbon composite structure and its preparation. Yu's mesoporous carbon composite structure is uniformly dispersed in a matrix of ZnO nanoparticles, wherein the mesoporous carbon structure is 50 to 80 wt. % of the total mass of the material, having pores of 2 to 50 nm. Yu's ZnO nano-particle size is 20 to 200 nm and accounts for 20 to 80% of the total mass of material. Yu uses a strong base as a precipitating agent, a zinc salt, a phenolic resin, and ethanol, to form spaced $Zn(OH)_2$ precursor particles, then carbonizes at 700 to 1,000° C. in an inert atmosphere, and washes to obtain a nano ZnO-mesoporous carbon nanocomposite. Yu's wurtzite-structured material may be used in photocatalysis, oxidation, decomposition of organic molecules, adsorption, dye wastewater treatment, and deodorizing. However, Yu's system requires various solvents and a complex admixture of components.

CN 102774822 A by Tang et al. (Tang) discloses a preparation method of a mesoporous carbon material, using ZnO as a template and organic polymer, such as polyacrylamide, as a carbon source. Tang chars the organic polymer at 450 to 1000° C. for 1 to 48 hours, then uses acid or base to remove the template ZnO to generate mesopores. Tang's mesopores have same size with the ZnO particles, but Tang's final structure does not contain ZnO and its intermediate structure does not contain mesopores.

CN 106373992 A by Qi et al. (Qi) discloses a boron-doped zinc oxide laminated sphere/p-type PET-ITO heterojunction and its preparation and use. Qi takes zinc nitrate hexahydrate, urotropine, and boric acid, prepares a thin ZnO seed crystal layer on the surface of a flexible PET-ITO substrate by ionic sputtering, then grows a B-doped ZnO nano-structure from a boron-doped zinc oxide solution hydrothermally, to obtain the B—ZnO/PET-ITO heterojunction which can be used as a catalyst. Qi's product has a laminated spherical form, and does not clearly contain ZnO particles, nor is it described as porous.

CN 106542516 B by Liu et al. (Liu) discloses a porous carbon mesh and its preparation, the mesh having a porous carbon, precise shape, and internal micro-porosity of 70% to 99.5% with a rod-polygon articulation structure. Liu's method uses additive manufacturing and burns filler material embedded within its porous carbon precursor, which is then pyrolyzed at 500 to 1000° C. under inert gas or vacuum atmosphere, then graphitized at 1100 to 3000° C. to obtain graphitized carbon reticulated porous. Liu's does not contain ZnO particles, but merely uses a metal oxide to impart porosity, after which the metal oxide is washed out. Liu also requires a regular, arrayed structure.

CA 2,720,606 C by Steinmeyer et al. (Steinmeyer) discloses a metal-terephthalate polymer from reacting PET with a metal (Ca, Mg, Fe, Al, Se, Zn, Sr, or Ba) compound in a non-aqueous melt environment at greater than 270° C., preferably about 520° C., preferably at low pressure. Steinmeyer's method may be used in recycling tire shreds to produce a carbon black rich powder that is enriched in the metal-terephthalate polymer. Steinmeyer's method reacts PET with polyvalent metal between the PET melting point (ca. 260° C.) and 380° C., or at 400-600° C. Steinmeyer produces a metal-terephthalate polymer, which is apparently non-porous, rather than a mesoporous ZnO/mesoporous composite.

JP 4565259 B2 by Shoji et al. (Shoji) discloses a method for rendering harmless a waste plastic material mixture containing chlorine-containing resins. Shoji mixes ZnO with the waste plastic and thermally decomposing at 180 to 300° C., then washing to remove chlorine components. Shoji also produces $ZnCl_2$, which is recycled ZnO, but not retained in Shoji's product, which is neither porous, nor graphite-containing.

CN 103420410 B by Lyu et al. (Lyu) discloses a process for preparing pure zinc powder as a ZnO nano powder precursor. Lyu's zinc powder is reacted with steam at a 150 to 240° C. for 5 to 10 hours, to obtain a particle diameter of 50 to 100 nm ZnO at 98% or more yield. Lyu's ZnO can be used in degrading dyes or environmental applications, but Lyu does not have a carbonaceous component to its product.

Chem. Eng. J. 2017, 313, 873-881 by Mallakpour et al. (Mallakpour) discloses using recycled PET bottle waste as a matrix in composites. Mallakpour describes multi-walled carbon nanotube (MWCNT)-ZnO quantum dot (QD) loadings of 1, 2, and 4 wt. %, into a PET matrix, converting pure polymer from electrically insulating to conducting at room temperature. Mallakpour describes that its composites can be used as absorbents for removal of Cd(II) ions from aqueous solution. Mallakpour does not describe a ZnO-mesoporous carbon (nano) composite, nor making such composites from PET and zinc powder.

J. Anal. Appl. Pyrolysis 2005, 73 (2), 248-256 by Terakado et al. (Terakado) discloses thermal decomposition of mixture of PET and metal oxide. Terakado describes that using ZnO or trivalent rare earth oxide ($Ln_2O_3$) resulted in porous, fiber-like structures with a diameter of ~1 μm for ZnO and ~100 nm or less for $Ln_2O_3$. Terakado's porous carbonaceous compounds from various PET-metal oxide mixtures from $PET-Fe_2O_3$ and $PET-Ln_2O_3$ had large mesopore volumes. Terakado pyrolyzes its PET with a metal oxide, rather than elemental metal, Terakado's structures are fiber-like, rather than plate-like, and its ZnO particle sizes are roughly micrometer scale.

Ecotox. Environ. Safety 2017, 145, 57-68 by El Essawy et al. (El Essawy) discloses "waste-treats-waste" by synthesis of graphene using PET bottle waste as a source material, applying the PET-based graphene for adsorption of methylene blue (MB) and acid blue 25 (AB25). El Essawy's plastic waste can be used, after transformation into carbon-based nanomaterials, in the adsorption of organic contaminants from aqueous solution. El Essawy does not describe a graphite nanomaterial, nor a nanomaterial comprising ZnO, nor a method using zinc dust or teach production of a ZnO/mesoporous carbon composite.

J. Adv. Oxid. Technol. 2017, 20 (2), 20170006 by Sandoval et al. (Sandoval) discloses the photocatalytic degradation of two industrial textile azo dyes (Acid Brown 83 and Direct Blue 1) titanium dioxide ($TiO_2$) and zinc oxide (ZnO) supported on PET or polystyrene (PS) substrates. Sandoval reports no significant statistical differences between using PET and PS as substrates on degradation rate constants for both dyes, though pH did influence rates. Sandoval does not disclose a graphite composite, nor one with embedded ZnO, nor converting PET and zinc powder to a ZnO-mesoporous carbon nanocomposite.

Based on the above, a need remains for carbon-based metal oxide composites, particularly from recycled waste, e.g., plastic materials such as PET, PP, PE, etc., and/or metals such as Zn, and methods of making such composites, as well as methods of managing and/or upcycling waste, purifying water and/or air, and degrading and/or decomposing organic compounds, such as dyes or phenols.

SUMMARY OF THE INVENTION

Aspects of the invention provide methods comprising: pyrolyzing a mixture comprising PET and metallic zinc, in a PET-to-zinc weight ratio of from 1000:1 to 5:1, at a temperature of 400° C. or more in an inert atmosphere, to obtain a mesoporous composition comprising elemental carbon and ZnO. Such methods may be modified by any permutation of the features described herein, particularly the following.

The pyrolyzing may be performed at a temperature in a range of from 500 to 800° C. The pyrolyzing may comprise heating a container sealed at ambient pressure. The pyrolyzing may be performed for a duration of from 30 to 120 minutes.

The PET may comprise at least 50 wt. % PET bottle waste, relative to all PET in the mixture. The PET may be at least 90 wt. % of carbon-containing material in the mixture.

The elemental carbon may be present in the composition in an amount of from 40 to 90 wt. % of total composition weight. The elemental carbon may be at least 75 wt. % graphite, relative to all elemental carbon in the composition.

The metallic zinc may comprise at least 75 wt. % zinc dust, relative to all zinc in the mixture. The metallic zinc may be at least 90 wt. % of all metals in the mixture.

Aspects of the invention include compositions comprising: graphite; and ZnO particles having an average diameter in a range of, e.g., from 10 to 100 nm, in and/or on the graphite in the form of a mesoporous ZnO-graphite composite, wherein the composite has a BET surface area in a range of, e.g., from 395 to 750 $m^2/g$, and wherein the composite has an average pore size in a range of, e.g., from 15 to 20 nm.

The BET surface area may be in a range of from 600 to 725 $m^2/g$.

The graphite and the ZnO particles may be at least 90 wt. % of total composition weight. The graphite is present in an amount of from 35 to 95 wt. %, relative to total composition weight, and/or the ZnO may be present in the composition an amount of from 5 to 65 wt. %, relative to the total composition weight. Inventive compositions may have a graphite-to-ZnO weight ratio in a range of from 1:1 to 5:1.

Aspects of the invention comprise mesoporous ZnO-graphite composites having a BET surface area of greater than 590 $m^2/g$, produced by any inventive method described herein.

Aspects of the invention provide methods for degrading an organic compound, the method comprising: contacting the organic compound with one or more mesoporous ZnO-graphite composite as described herein in the presence of ultraviolet light.

The contacting may reduce a concentration of the organic compound by at least 60% within 30 minutes. The organic compound may comprise a dye. The organic compound may comprise methylene blue and/or malachite green.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7A to E show $N_2$ adsorption desorption isotherms of plastic bottles after pyrolysis at 700° C. in inert atmosphere in the absence of Zn dust (PET 700); and in presence of Zn dust in different amounts (PETZ 0.1, PETZ 0.5, PETZ 0.75 and PETZ 1.0);

FIG. 7A shows $N_2$ adsorption desorption isotherms of plastic bottles after pyrolysis at 700° C. in inert atmosphere in the absence of Zn dust (PET 700);

FIG. 7B shows $N_2$ adsorption desorption isotherms of plastic bottles after pyrolysis at 700° C. in inert atmosphere in presence of Zn dust (PETZ 0.1), FIG. 7C shows $N_2$ adsorption desorption isotherms of plastic bottles after pyrolysis at 700° C. in inert atmosphere in presence of Zn dust (PETZ 0.5);

FIG. 7D shows $N_2$ adsorption desorption isotherms of plastic bottles after pyrolysis at 700° C. in inert atmosphere in presence of Zn dust (PETZ 0.75);

FIG. 7E shows $N_2$ adsorption desorption isotherms of plastic bottles after pyrolysis at 700° C. in inert atmosphere in presence of Zn dust (PETZ 1.0);

FIG. 9A shows UV-vis absorption spectra of an aqueous solution of methylene blue (MB) during illumination in the presence of PETZ 0.1 at pH 6.7;

FIG. 9B shows the photocatalytic degradation efficiency of MB as the variation of $C/C°$ with irradiation time in the presence of PET 700, PETZ 0.1, PETZ 0.5, PETZ 0.75, and PETZ 1.0;

FIG. 10A shows UV-vis absorption spectra of an aqueous solution of malachite green (MG) during illumination in the presence of PETZ 0.1 at pH 6.7;

DETAILED DESCRIPTION OF THE PREFERRED EMBODIMENTS

Figure 1:
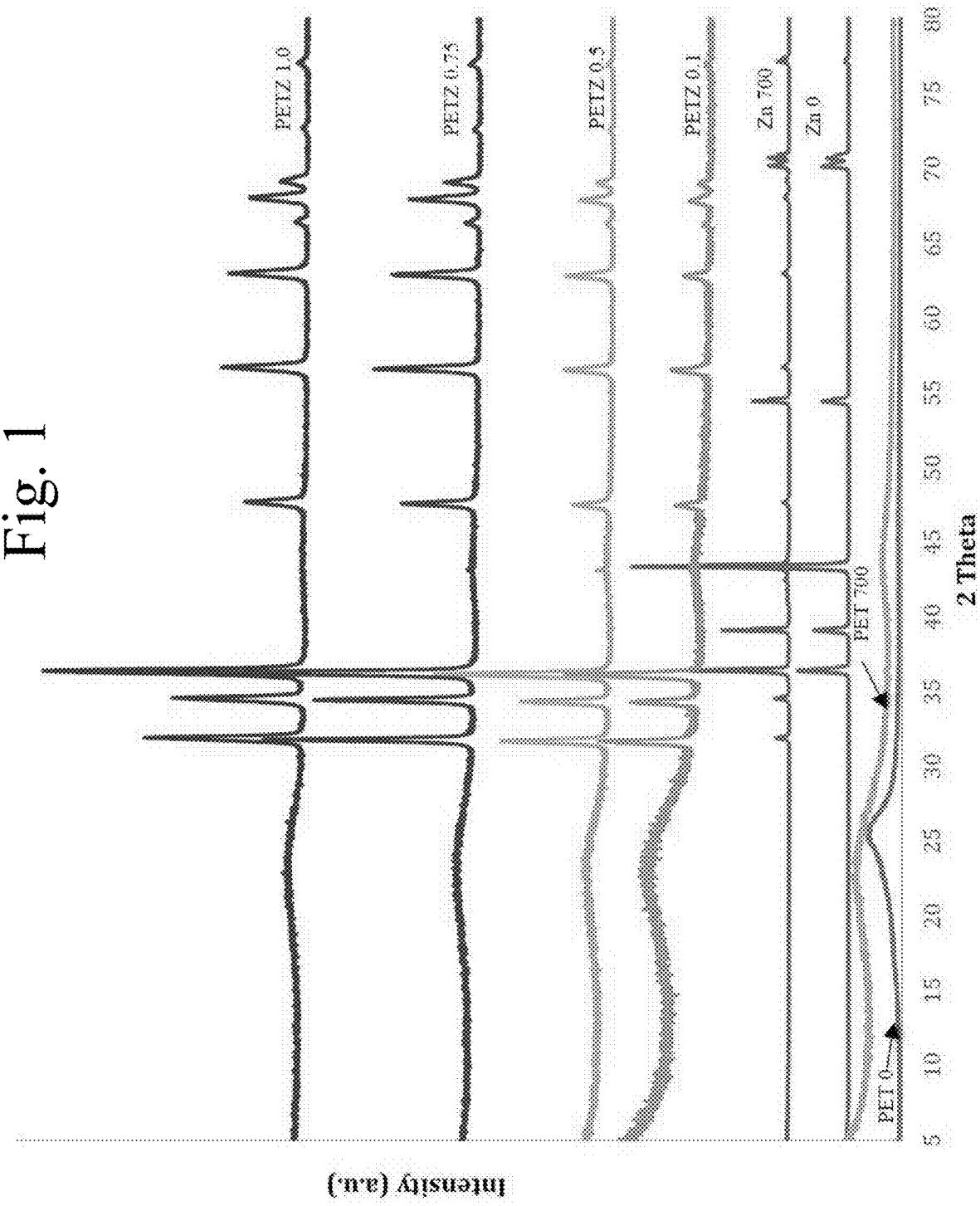
FIG. 1 shows x-ray diffraction (XRD) patterns of raw polyethylene terephthalate (PET) bottle material (PET 0), raw zinc dust (Zn 0), zinc dust after pyrolysis at 700° C. (Zn 700), PET material after 700° C. pyrolysis in inert atmosphere in absence of Zn dust (PET 700), plastic bottles after 700° C. pyrolysis in inert atmosphere in presence of 0.1 g (PETZ 0.1), 0.5 g (PETZ 0.5), 0.75 g (PETZ 0.75), 1.0 g (PETZ 1.0) of Zn dust.

Aspects of the invention provide methods comprising: pyrolyzing a mixture comprising a plastic, such as PET, and a metal, such as metallic zinc, in a PET-to-zinc (plastic-to-metal) weight ratio of from 1000:1 to 5:1, e.g., either of these endpoints or at least 900:1, 800:1, 700:1, 600:1, 500:1, 400:1, 300:1, 200:1, 100:1, 75:1, 65:1, 60:1, 55:1, 50:1, 45:1, 40:1, or 33:1 and/or up to 4.5:1, 4.75:1, 5.5:1, 6:1, 7.5:1, 8:1, 9:1, 10:1, 12.5:1, 15:1, 17.5:1, 20:1, 22.5:1, 25:1, 27.5:1, or 30:1, or any combination of these, at a temperature of 400° C. or more, e.g., at least 425, 450, 475, 500, 525, 550, 575, 600, 625, 650, 675, 700, or 725° C. and/or up to 825, 795, 785, 775, 765, 750, 725, 700, 675, or 650° C., or any combination of these, in an inert atmosphere, to obtain a mesoporous composition comprising elemental carbon and ZnO. The inert atmosphere will generally involve a gas, such as $N_2$, Ar, He, or the like, which does not react with the PET or metal, though $O_2$, an $O_2$-containing gas, and/or air may be present. Preferably, pyrolyzing will not be in a reducing environment and/or under vacuum. Preferably, no more than 33, 25, 20, 15, 10, 7.5, 5, 4, 3, 2, 1, or 0.5 mol. % of $O_2$ will be present in the pyrolyzing atmosphere, relative to the total environmental gas composition for the pyrolyzing. The pyrolyzing may be performed at a temperature in a range of from 500 to 800, 550 to 750, 575 to 725, 600 to 700° C., or any combination of these.

The PET may comprise at least 50, 60, 70, 75, 80, 85, 90, 91, 92, 92.5, 93, 94, 95, 96, 97, 97.5, 98, 99, 99.1, 99.5, or 99.9 wt. % PET bottle waste, relative to all PET in the mixture. The PET may be replaced and/or supplemented by any alternate plastic described herein.

The PET in the mixture may be at least 90, 92.5, 95, 97.5, 98, 99, 99.1, 99.5, or 99.9 wt. % of carbon-containing material in the mixture. That is, the PET may be used in the pyrolysis without any further (and/or added) polymers, resins, adhesives, coatings, or lubricants. In the case of waste plastics, e.g., PET, the plastic component(s) may comprise labels, coatings, fillers, and/or adhesives, which may make out up to 15, 10, 7.5, 5, 4, 3, 2, 1, or 0.5 wt. % of the carbon-containing component weight, relative to the total carbon-containing component (e.g., plastic) weight.

The elemental carbon may be present in the composition in an amount of from 40 to 90 wt. %, e.g., either of these or at least 45, 50, 55, 60, 65, 70, 72.5, 75, 77.5, 80, 82.5, or 85 wt. % and/or 95, 92.5, 91, 89, 87.5, 85, 82.5, 80, 77.5, 75, 72.5, or 70 wt. % of total composition weight. The elemental carbon may be at least 50, 65, 75, 80, 85, 90, 91, 92, 92.5, 93, 94, 95, 96, 97, 97.5, 98, 99, 99.1, 99.5, 99.9, or 99.99 wt. % graphite, relative to all elemental carbon in the composition.

The metal and/or metallic zinc may comprise at least 75, 80, 85, 90, 92.5, 95, 97.5, 98, 99, 99.1, 99.5, or 99.9 wt. % zinc dust, relative to all zinc in the mixture. Metallic zinc may be at least 90, 91, 92, 92.5, 93, 94, 95, 96, 97, 97.5, 98, 99, 99.1, 99.5, or 99.9 wt. % of all metals in the mixture. Moreover, ZnO may be at least 90, 91, 92, 92.5, 93, 94, 95, 96, 97, 97.5, 98, 99, 99.1, 99.5, or 99.9 wt. % of all metals and/or metal oxides in the composition. The pyrolyzing may comprise heating a container sealed at ambient pressure, i.e., without adding or removing gas beyond ambient conditions. The ambient pressure may be supplied by air or inert gas, such as nitrogen, argon, or helium. The pyrolyzing may be performed for a duration of from 30 to 120 minutes, e.g., either of these or at least 35, 40, 45, 50, 55, or 60 minutes and/or up to 150, 135, 115, 110, 105, 100, 95, 90, 85, 80, 75, 70, 65, 60, 55, 50, or 45 minutes, or any combination of these.

Aspects of the invention include compositions comprising: graphite; and ZnO particles having an average diameter in a range of from 10 to 100 nm, e.g., either of these or at least 15, 20, 25, 30, 35, 40, 45, 50, 55, or 60 nm and/or up to 95, 90, 85, 80, 75, 70, 65, 60, 55, 50, 45, or 40, in and/or on the graphite in the form of a mesoporous ZnO-graphite composite, wherein the composite has a BET surface area in a range of from 395 to 750 $m^2/g$, e.g., either of these or at least 400, 425, 450, 475, 500, 525, 550, 575, 585, 590, 595, 600, 605, 610, or 615 $m^2/g$ and/or up to 775, 750, 740, 730, 720, 710, 705, 695, 690, or 685 $m^2/g$. The composite may have an average pore size in a range of from 15 to 20, 16 to 19.5, 17 to 19, or 18 to 18.5 nm. The BET surface area of inventive compositions may be in a range of from 600 to 725, 615 to 715, 630 to 705, 615 to 695 $m^2/g$.

The graphite and the ZnO particles may make out at least 90, 91, 92, 92.5, 93, 94, 95, 96, 97, 97.5, 98, 98.5, 99, 99.1, 99.5, or 99.9 wt. % of total composition weight. The graphite is present in an amount of from 35 to 95 wt. %, e.g., either of these or at least 40, 42.5, 45, 47.5, 50, 52.5, 55, 57.5, 60, 62.5, 65, 67.5 70, 72.5, 75, 77.5, 80, 82.5, or 85 wt. % and/or up to 92.5, 87.5, 85, 82.5, 80, 77.5, 75, 72.5, 70, 67.5, 65, 62.5, or 60 wt. %, relative to total composition weight, and/or the ZnO may be present in the composition an amount of from 5 to 65 wt. %, e.g., either of these or at least 7.5, 10, 12.5, 15, 17.5, 20, 25, or 30 wt. % and/or up to 62.5, 60, 57.5, 55, 52.5, 50, 47.5, 45, 40, or 35 wt. %, relative to the total composition weight. Inventive compositions may have a graphite-to-ZnO weight ratio in a range of from 1:1 to 5:1, 1.5:1 to 4.5:1, 2:1 to 4:1, 2.5:1 to 3.5 to 1, or any of these and/or at least 1.05:1, 1.1:1, 1.2:1, 1.25:1, 1.33:1, 1.67:1, or 1.75:1 and/or up to 5:1, 4.25:1, 3.75:1, 3.25:1, 3:1, 2.75:1, or 2.5:1.

Aspects of the invention comprise mesoporous ZnO-graphite composites having a BET surface area of greater than 590 $m^2/g$, or any other inventive BET surface area described herein, produced by any inventive method described herein. Inventive aspects may provide any of the composites described herein as filtering components, e.g., in air or water/fluid filters. Such filters may comprise multiple layers, optionally varying in composition, of inventive composites, through which gases and/or liquids pass.

Aspects of the invention provide methods for degrading an organic compound, the method comprising: contacting the organic compound with one or more mesoporous ZnO-graphite composite as described herein in the presence of ultraviolet light. Organic compounds subject to such degradation may include pharmaceuticals, dyes, soaps, oils, and adhesives, e.g., fluorescent and/or phosphorescent compounds, chromophores and/or colorless compounds. The organic compound may comprise a dye, including acid dyes, basic dyes, direct dyes, reactive dyes, mordant dyes, etc., such as one or more azo dyes, acridine dyes, anthraquinone dyes, arylmethane dyes, diarylmethane dyes, triarylmethane dyes, phthalocyanine dyes, quinone-imine dyes, azin dyes, eurhodine dyes, safranine dyes, indamines, indophenol dyes, oxazine dyes, oxazone dyes, thiazine dyes, thiazole dyes, xanthene dyes, fluorene dyes, pyronine dyes, fluorone dyes, rhodamine dyes, or mixtures of these. The organic compound may comprise methylene blue and/or malachite green.

The contacting may reduce a concentration of the organic compound by at least 60, 65, 70, 75, 80, 85, 90, or 95% within 30 minutes. Such reductions may be achieved, for example, within 60, 50, 45, 40, 35, 30, 25, 20, or 15 minutes, depending upon the compound in question. The presence of inventive composites may reduce the concentration of the organic compound(s) with or without irradiated visible and/or UV light. The irradiation may use sunlight or an artificial light (e.g., from a lamp), including broad wavelength UV and/or visible light, e.g., from 10 to 1000 nm, or fractions thereof, such as ranges including endpoints selected from 100±5, 10, 20, 25, 30, 40, or 50, 200±5, 10, 20, 25, 30, 40, or 50, 300±5, 10, 20, 25, 30, 40, or 50, 400±5, 10, 20, 25, 30, 40, or 50, 500±5, 10, 20, 25, 30, 40, or 50, 600±5, 10, 20, 25, 30, 40, or 50, 700±5, 10, 20, 25, 30, 40, or 50, 800±5, 10, 20, 25, 30, 40, or 50, or 900±5, 10, 20, 25, 30, 40, or 50 nm.

Aspects of the invention provide simultaneous upcycling of plastic waste and metal waste into useful metal oxide-porous carbon nanocomposites, particularly using polyethylene terephthalate (PET) bottle waste. Aspects of the invention provide mesoporous ZnO-graphite nanocomposites, optionally from Zn dust/PET bottle mixed waste, by pyrolysis (solvent free), to synthesize graphite. PET waste from bottles, containers, or otherwise, makes out a considerable part of the total plastic waste in the environment, and it can be utilized as model plastic waste, and Zn dust can be utilized as a model metal waste. Aspects of the invention include facile thermal methods of upcycling Zn-PET bottle mixed waste into nanocomposites of ZnO nanoparticles and mesoporous graphite. Aspects of the invention provide mesoporous ZnO-graphite nanocomposites, optionally from Zn and/or PET (bottle) waste, which may be used, e.g., as photocatalysts. Waste-based nanocomposites can exhibit a superior photocatalytic activity for the degradation of organic compounds including organic dyes, such as methylene blue and malachite green, which may serve as model water pollutants. Further potential applications in the scope of the invention may include environmental remediation utilizing waste materials, minimizing input costs, separative recycling planning, and/or sustainable development management.

Aspects of the invention include transforming Zn metal to ZnO nanoparticles in the presence of polymer waste, e.g., PET, while no transformation of Zn metal to ZnO nanoparticles occurs in the absence of PET. Aspects of the invention comprise a mutual transformation of Zn into ZnO and transformation of the (PET) bottle waste into mesoporous graphite upon thermal treatment, particularly at 700° C. in inert atmosphere. Inventive nanocomposites, optionally mixed waste-based, can exhibit superior photocatalytic activity for the degradation of organic dyes (methylene blue and malachite green) under UV irradiation, e.g., complete degradation of 20, 30, 40, 50, 75, 100, 250, or 500 mg/L solutions after 75, 70, 65, 60, 55, 50, 45 minutes or less. Aspects of the invention provide critical concentrations for photocatalytic activity of ZnO@graphite composites, which may be attributed to electron pair separation achieved by the electronic interaction between ZnO and graphite and due to an extensive π-π conjugation system. Inventive methods can be applied to different metal(s), e.g., Fe, Sn, Cr, Al, Ni, Cu, Co, Mn, Mo, Pb, In, Ag, Pd, Pt, Rh, Ru, and/or W, and/or different plastic waste(s), e.g., addition, condensation, and/or radical polymers including polyolefins, polyesters, poly(meth)acrylates, polyethers, polyamides, polycarbonates, polyurethanes, polyimides, polystyrenes, and/or elastomers, such as PE, PP, PBT, PAN, ABS, nylon 6, nylon 6,6, nylon 510, nylon 1,6, nylon 12, PS, PEK, PEEK, PES, PPS, POM, PBI, PVC, PB, PTFE, PVdF, PVAc, PVA, PGA, PLA, PBS, PEA, PHB, PEN, PTT, PPPVE, PPMVE, PHFP, PCTFE, PMMA, or their mixtures and/or mixed (e.g., co-, or ter-) polymers, and the produced nanocomposite materials may be applied in various photocatalytic systems.

Inventive compositions generally use Zn metal, rather than a Zn salt, e.g., $ZnCl_2$, $ZnSO_4$, $Zn(CN)_2$, $ZnBr_2$, $Zn(NO_3)_2$, $ZnI_2$, $ZnMoO_4$, $ZnC_2O_4$, $Zn(ClO_4)_2$, $Zn_3(PO_4)_2$, $Zn(BF_4)_2$, $(C_6H_5O_7)_2Zn_3$, $(CH_3C_6H_4SO_3)_2Zn$, and/or $Zn(NO_3)_2$, and may contain no more than 10, 5, 2.5, 1, or 0.1 wt. % of any or all such salts, based on the total composition weight.

Inventive methods and/or compositions need not use acids in the preparation, such as HCl, HF, HI, HBr, $H_2SO_4$, $B(OH)_3$, etc., or mixtures thereof. Inventive compositions may be free of detectable amounts of, or contain no more than 5, 4, 3, 2, 1, 0.5, 0.1, 0.05, 0.01, 0.005, 0.001, 0.0005, or 0.0001 wt. %, based on total material weight, of boron.

Inventive methods need not use strong bases, e.g., cations of Na, K, Li, and/or Mg with, e.g., anions of OH and/or $CO_3$, and/or solvents, such as pyridine, N,N-dimethylformamide (DMF), N,N-dimethylacetamide, N-methyl pyrrolidone (NMP), hexamethylphosphoramide (HMPA), dimethyl sulfoxide (DMSO), acetonitrile, tetrahydrofuran (THF), 1,4-dioxane, dichloromethane, chloroform, carbon tetrachloride, dichloroethane, acetone, ethyl acetate, pet ether, pentane, hexane(s), decalin, THF, dioxane, toluene, xylene(s), o-dichlorobenzene, diethyl ether, methyl t-butyl ether, methanol, ethanol, ethylene glycol, isopropanol, propanol, and/or n-butanol (other than for washing, e.g., with water). Inventive methods and/or compositions may comprise no more than 15, 10, 5, 4, 3, 2, 1, 0.5, 0.1, 0.01, 0.001, or 0.0001 wt. %, based on total material weight, or no more than trace detectable amounts of such bases and/or solvents. Inventive methods and/or compositions may comprise no more than 5, 4, 3, 2, 1, 0.5, 0.1, 0.05, 0.01, 0.005, 0.001, 0.0005, or 0.0001 wt. %, based on the total material weight, or no more than trace detectable amounts of surfactants, and the structure of inventive compositions may be unaffected by micelle formation and/or the presence of surfactants.

Inventive compositions are preferably made in the absence of $H_2$, or with no more than 2.5, 2, 1, 0.5, 0.1, 0.01, 0.001, 0.0001, or 0.00001 mol. % $H_2$, relative to all gases in the calcining atmosphere.

Inventive materials generally have an irregular shape, i.e., without or with no more than more than 40, 33, 25, 20, 15, 10, 7.5, 5, 4, 3, 2, 1, or 0.5% regular and/or repeated structural, relative to total volume and/or surface area. Inventive materials may have fractal-like surface topology, clustered (grape-like) agglomerated features, or the like.

Inventive compositions may avoid or comprise no more than 10, 5, 2.5, 1, 0.5, 0.1, 0.01, 0.001 wt. %, relative to the total composition weight, of Al powder, Ti powder, Fe powder, Cu powder, $SiO_2$, MgO, titanium oxide (e.g., TiO, $TiO_2$, $Ti_3O$, $Ti_2O$, $Ti_2O_3$), $CeO_2$, $Al_2O_3$, iron oxide (e.g., $Fe_2O_3$, FeO, $Fe_3O_4$), manganese oxide (e.g., MnO, $Mn_3O_4$, $Mn_2O_3$, $MnO_2$, $MnO_3$, $Mn_2O_7$), copper oxide (e.g., $Cu_2O$, CuO, $CuO_2$, $Cu_2O_3$), tungsten oxide (e.g., $W_2O_3$, $WO_2$, $WO_3$, $W_2O_5$), NaCl, $MgCl_2$, KCl, $CaCl_2$), $FeCl_3$, $TiCl_4$, $BaCl_2$, CuCl, $CuCl_2$, $K_2CO_3$, $Na_2CO_3$, $CaCO_3$, and/or $MgCO_3$.

The porosity of inventive materials need not be constant, i.e., equally distributed as viewed on a 2D and/or 3D perspective, but the materials may also have gradient pore distributions, either in 2D—i.e., a varying porosity from one side, quadrant, or portion of a quadrant, to the other side(s), quadrant(s), and/or portion(s) of the quadrants, or in 3D—i.e., a varying porosity from an outer and/or inter surface of the 3D material in a direction orthogonal to an outer tangential plane to a surface of the 3D material, i.e., inwardly to and/or outwardly from the center of the material. The porosity pattern, if varied, may vary in any manner, such as linearly, i.e., as a function $f(x) \sim k^x x$, where k is a constant related to the porosity and x is a displacement, or decay exponentially, i.e., as a function $f(x) \sim e^{-kx}$. For example, porosity plots from an outer and/or inner surface of inventive materials may be represented by a plotted form of the function, $e^{-x}$, $e^{-x/2}$, $e^{-x/3}$, $e^{-5x}$, $e^{-10x}$, $e^{-15x}$, and/or $e^{-25x}$. This could mean a highly porous outer and/or inner surface and a less porous core, a porous core relative to outer surface, a porous outer surface relative to the inner surface, or a porous inner surface relative to the outer surface, etc. For relative porosities, a "more porous" portion or volume may be, e.g., 1.5, 2, 2.5, 3, 5, 10-fold the porosity of a "less porous" portion. The porosity may vary, along the surface from one face of a sphere of material to another, and/or towards the center from the outside, or the like.

Examples

ZN DUST-PET WASTE INTO MESOPOROUS ZNO-GRAPHITE COMPOSITES: Polyethylene terephthalate (PET) bottle waste was transformed into carbon-based nanomaterials by thermal decomposition, i.e., pyrolysis, in the presence of Zn metal. In a typical method, the plastic water bottles were first cut into small pieces, e.g., at least 0.1, 0.2, 0.25, 0.3, 0.4, 0.5, 0.6, 0.75, 0.8, 0.9, 1, 1.25, 1.5, 1.75, or 2 cm² and/or up to 4, 3.5, 3, 2.5, 2, 1.9, 1.8, 1.7, 1.6, 1.5, 1.4, 1.3, 1.25, 1.2, 1.1, or 1 cm², and then washed with distilled water and air dried. 10 g of the bottle pieces was transferred to Pyrex dish and placed in stainless steel vessel. A desired amount of zinc dust (0.1, 0.5, 0.75, or 1 g) was added to the bottle pieces. After that, the vessel was tightly closed and then transferred into muffle furnace and heated at 700° C. for 1 hour to afford a shiny black powder. For comparison, plastic bottle pieces were thermally degraded in an otherwise identical manner but for the absence of zinc dust, and zinc dust was thermally treated in the absence of the bottle waste under the same conditions. The samples were respectively designated as PET 0, Zn 700, PET 700, PETZ 0.1, PETZ 0.5, PETZ 0.75, and PETZ 1.0, for the raw plastic bottles before thermal treatment (PET 0), the bottles after thermal treatment at 700° C. in the absence of Zn dust (Zn 700), the Zn dust after thermal treatment at 700° C. in the absence of bottle waste (PET 700), and PET bottle waste material after thermal treatment in the presence of 0.1 g (PETZ 0.1), 0.5 g (PETZ 0.5), 0.75 g (PETZ 0.75), or 1 g (PETZ 1.0) of Zn dust.

MATERIAL CHARACTERIZATION: The materials prepared as described above were characterized by XRD, SEM, TEM, Raman spectroscopy; thermal gravimetric analysis (TGA), $N_2$ adsorption desorption, and BET surface area measurements to evaluate the quality, performance and physical properties of the materials. The clean, dried water bottle pieces were also ground into fine particles for characterization. X-ray diffraction measurements were performed using a Shimadzu XRD Powder diffractometer (xrd-700, Maxima) with a Cu radiation source, at a scanning speed of 2° min$^{-1}$, 40 kV tube voltage, and 30 mA tube current, with a scanning range of 5° to 90°. The thermal decomposition of the materials was recorded with a Shimadzu (DTG-60H) DTA-TGA thermal analyzer in the temperature range 25 to 1000° C. The specific surface area and pore diameter of the samples were measured by $N_2$ adsorption isotherm using the Brunauer-Emmett-Teller (BET) method for determining surface area, measured on Quantachrome NOVA 1200e analyzer at 77k. Raman spectrum were obtained using a Thermo Scientific spectroscope with a 532-nm laser as an excitation source. The concentration of heavy metal ions was determined by a flame atomic absorption spectrometer on a Shimadzu AA-7000 device. The thermal treatment of the samples was performed using a Barnstead Thermolyne 6000 Muffle Furnace, burning at 700° C. in an air atmosphere. Sonication was performed on a Cole Parmer model 8893 sonicator at 42 kHz. The ultra-high pure water was provided by Thermo Scientific Barnstead Easypure RoDi device. An FEI ISPECT S50 (Czech Republic) scanning electron microscope (SEM) was used to examine the surface morphological features of the specimens. SEM was performed using an acceleration voltage of 20 kV, a working distance of ~10 mm, and a spot size 3. The powder specimens were mounted onto a metallic slab with double-sided adhesive tape. Images were captured at different magnifications to record the representative features of the specimens. SEM micrographs were taken with secondary electron (SE) and (BSE) detectors to identify the existence of ZnO particles in the carbon sheets. For transmission electron microscopy (TEM), the powder was dispersed in ethanol, sonicated for 5 minutes, and deposited onto a TEM grid having porous carbon support film. The grids were dried and observed under the electron beam of the TEM at low and high magnifications. An FEI Morgagni 268 (Czech Republic) TEM at 80 kV was used to record the images. To verify the XRD data and evaluate the local crystalline nature of the synthesized products, the electron diffraction patterns in the TEM were also captured.

PHOTOCATALYTIC PERFORMANCE: The photocatalytic activity of the materials synthesized as described above was analyzed by measuring the degradation of the organic dyes, methylene blue (MB) and malachite green (MG), as model water pollutants. All the photocatalytic experiments were carried out using a 250 mL column glass reactor with an inserted 125 W medium pressure mercury UV lamp. In all experiments 1 g/L of the prepared sample (PET 700, PETZ 0.1, PETZ 0.5, PETZ 0.75 and PETZ 1.0) was homogeneously dispersed in 100 mL of ultra-high pure water. After that, 100 mL of 20 mg/L of aqueous dye solutions (MB or MG) was added to the previous suspension. All experiments were carried out at natural pH (6.7). Prior to the photocatalysis, the suspensions containing the catalyst and the organic dye were magnetically stirred in the dark for 30 minutes to establish adsorption-desorption equilibrium. The irradiation was performed under magnetic stirring and air bubbling through the suspensions at room temperature. Sample aliquots (5 mL) were taken at the desired time and then centrifuged to separate the solid catalyst. The concentration of the dye (MB, MG) in the centrifuged aqueous samples was determined by UV-vis absorbance, with a maximum at 665 nm for methylene blue (MB) and at 635 nm for malachite green (MG) before and after illumination. The degradation efficiency of the nanocomposite samples was defined in terms of the C/Co ratio, where Co and C represent the initial and final concentrations of the dye at to and t respectively.

Figure 2:
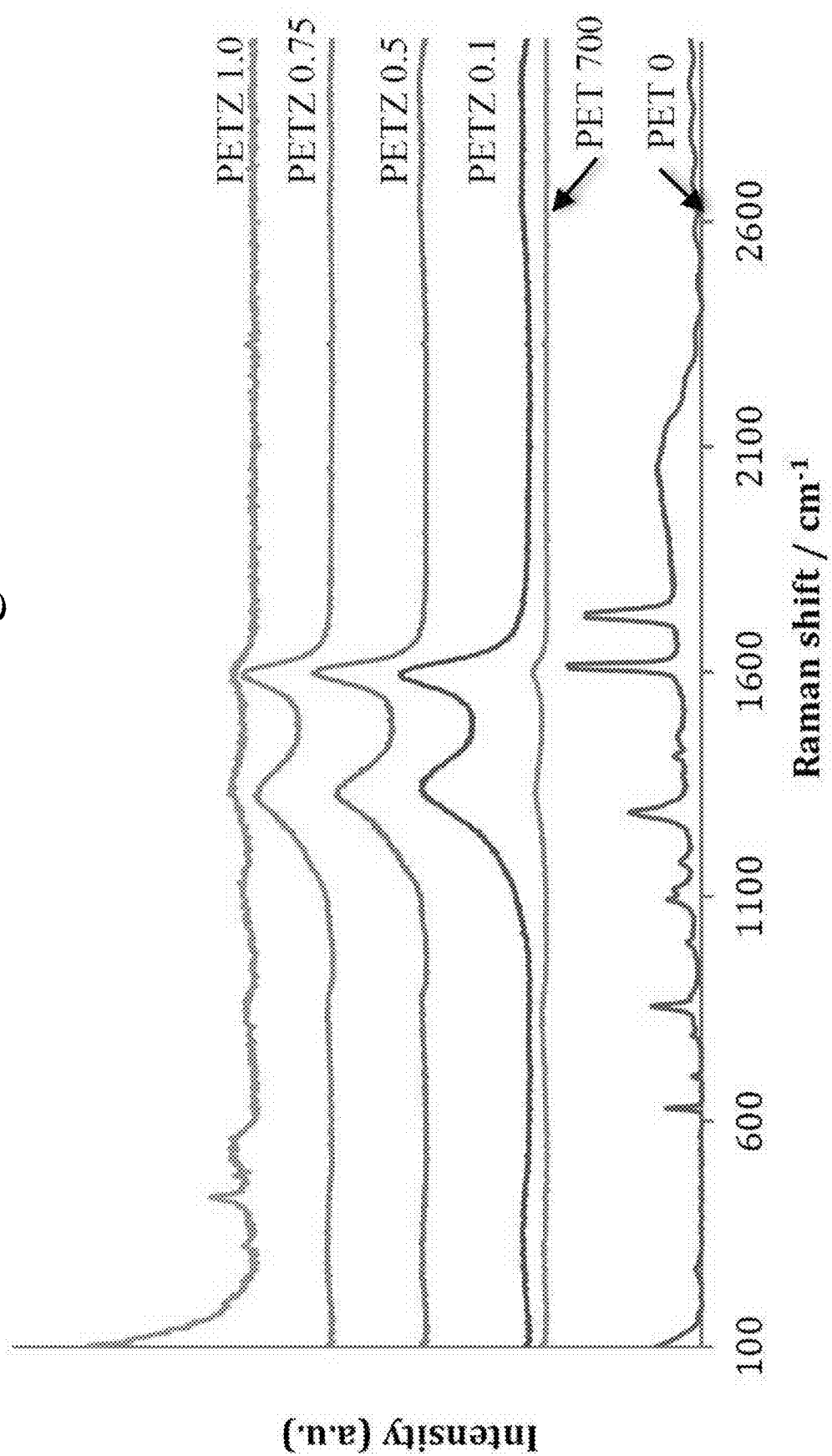
FIG. 2 shows Raman spectra of PET 0, PET 700, PETZ 0.1, PETZ 0.5, PETZ 0.75, and PETZ 1.0.
Figure 3A:
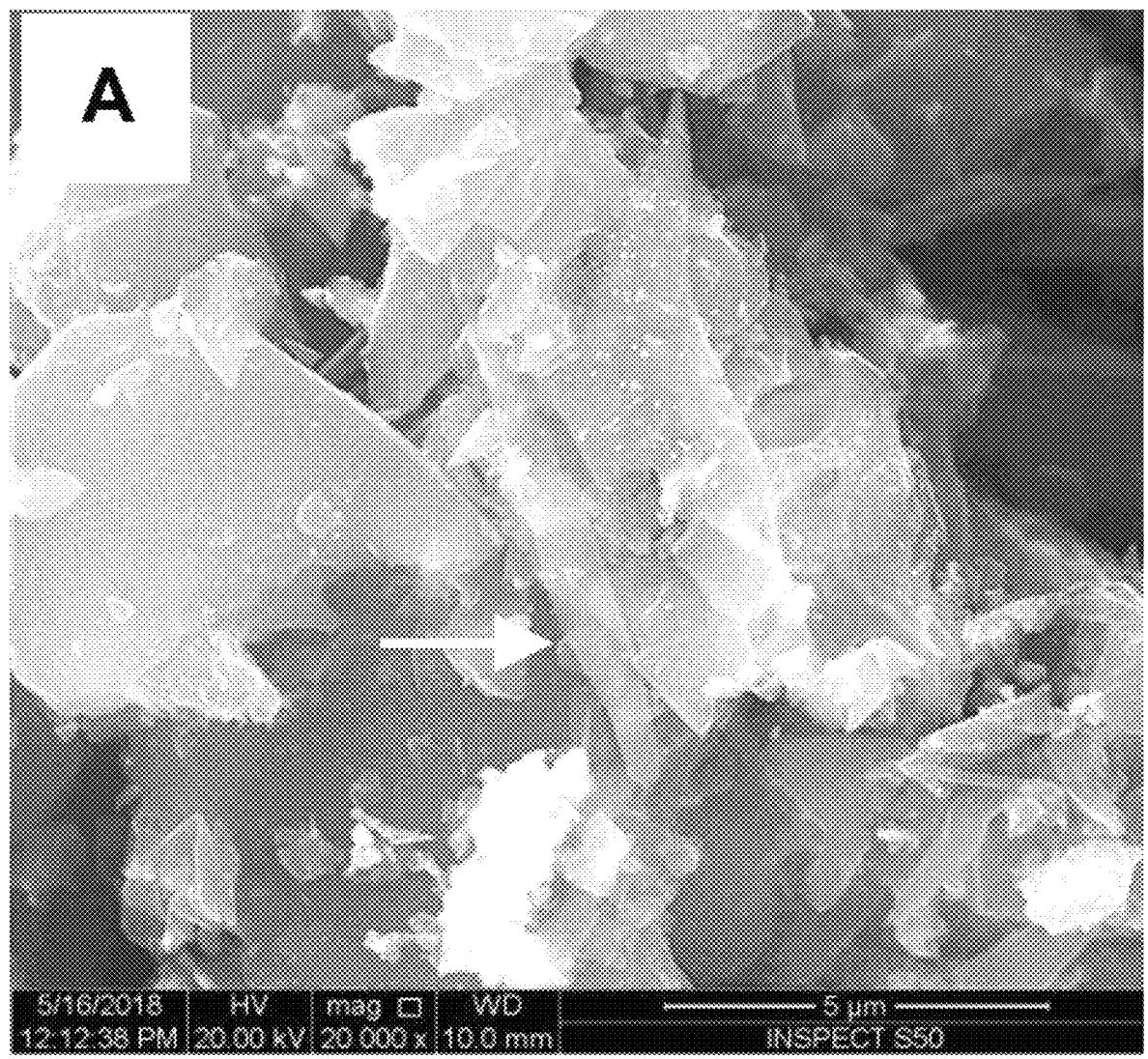
FIG. 3A shows a scanning electron microscope (SEM) secondary electron (SE) image at 20k-× magnification of PETZ 0.1.
Figure 3B:
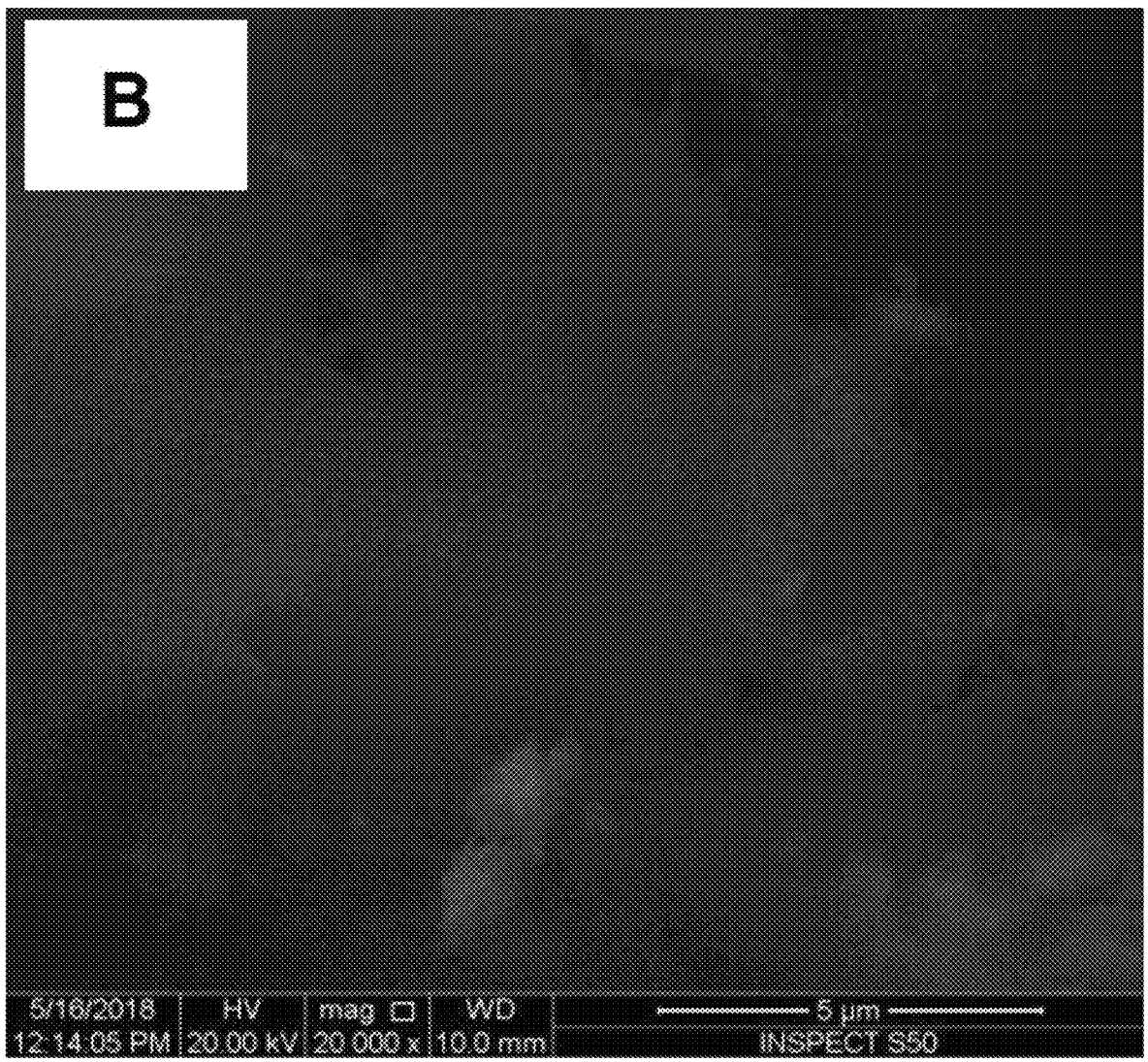
FIG. 3B shows a corresponding SEM back-scattered electron (BSE) image of PETZ 0.1.
Figure 3C:
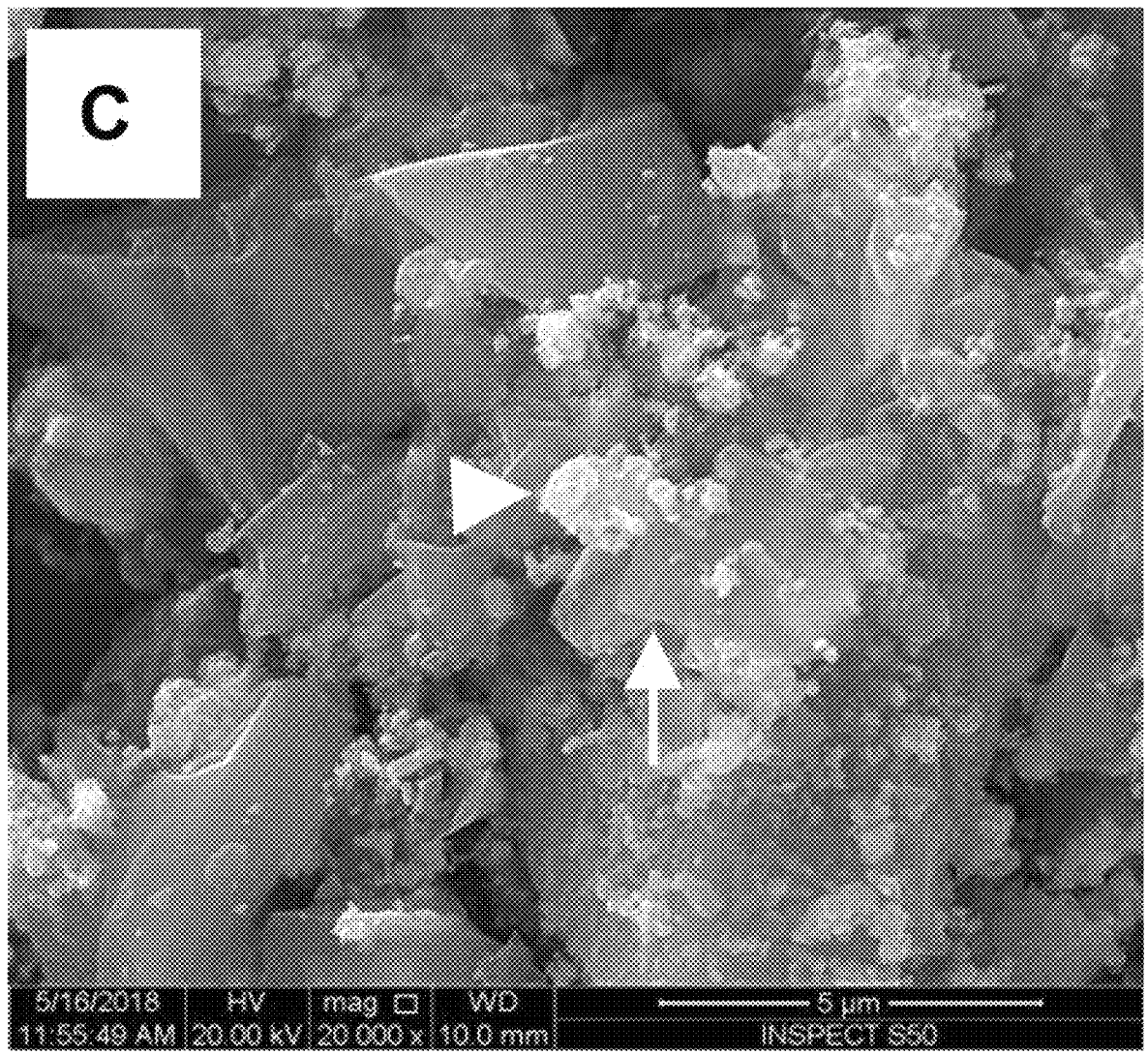
FIG. 3C shows an SEM-SE image at 20k-× magnification of PETZ 0.5.
Figure 3D:
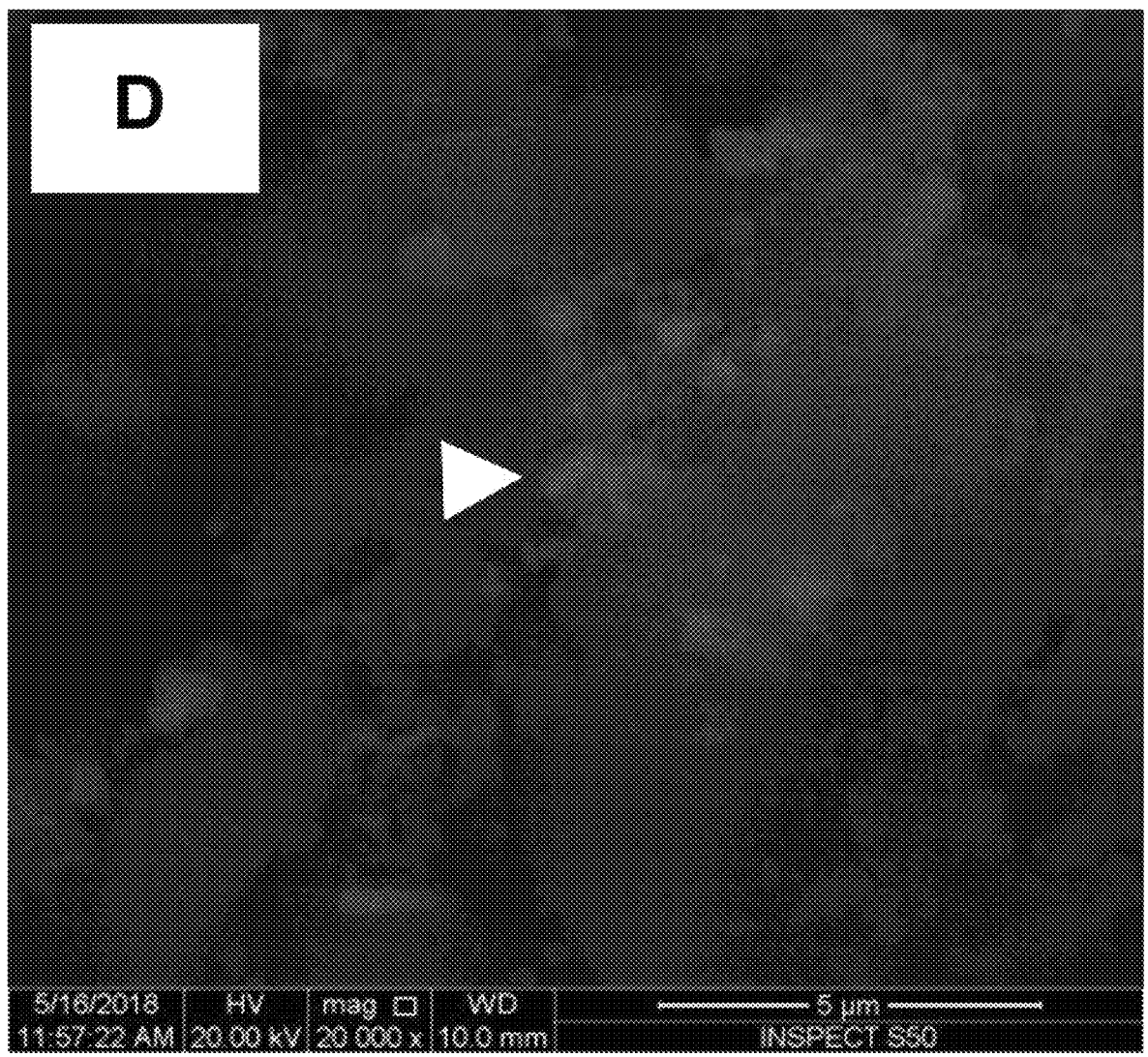
FIG. 3D shows a corresponding SEM-BSE image of PETZ 0.5.
Figure 3E:
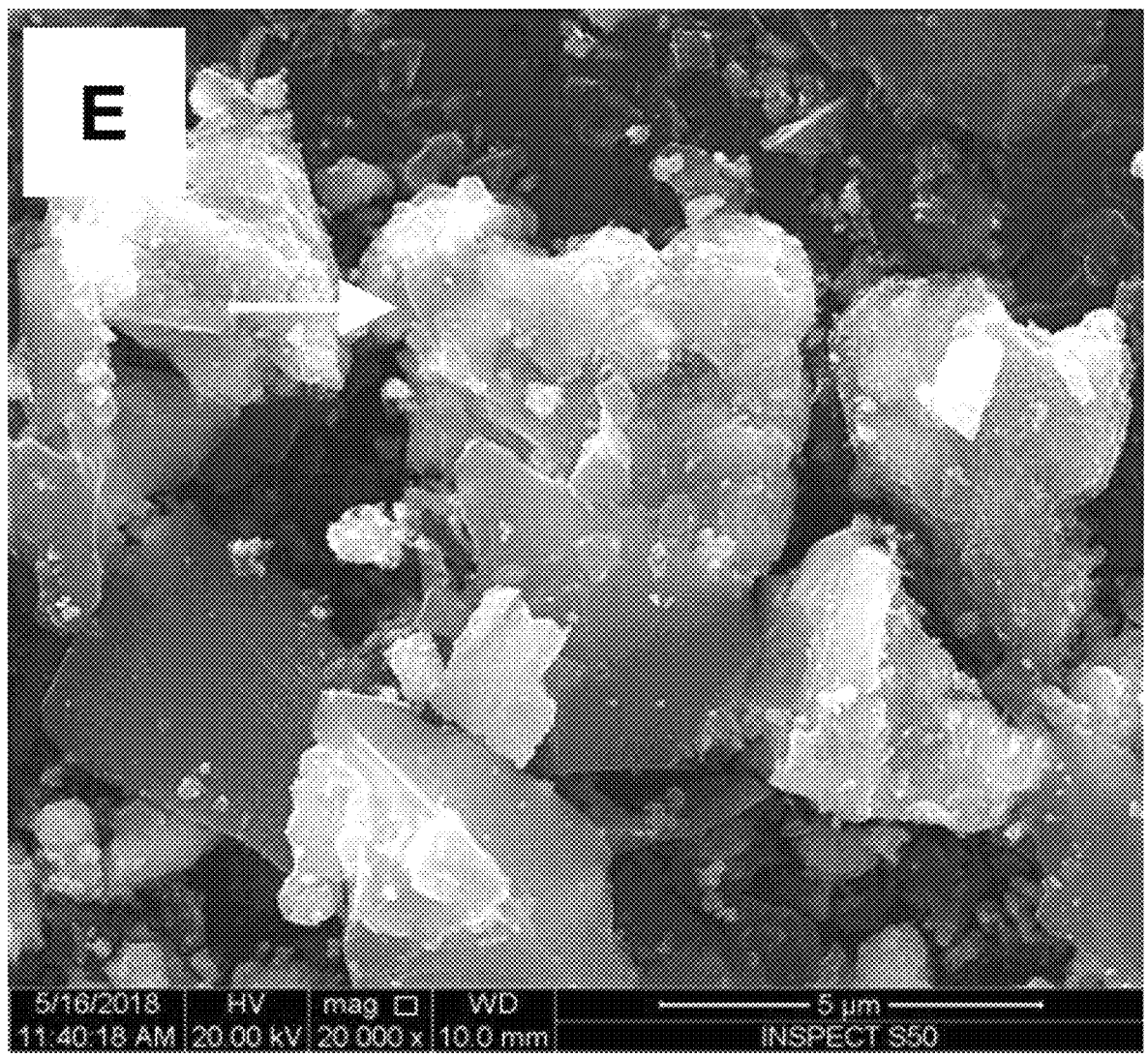
FIG. 3E shows an SEM-SE image at 20k-× magnification of PETZ 0.75 and PETZ 1.0.
Figure 3F:
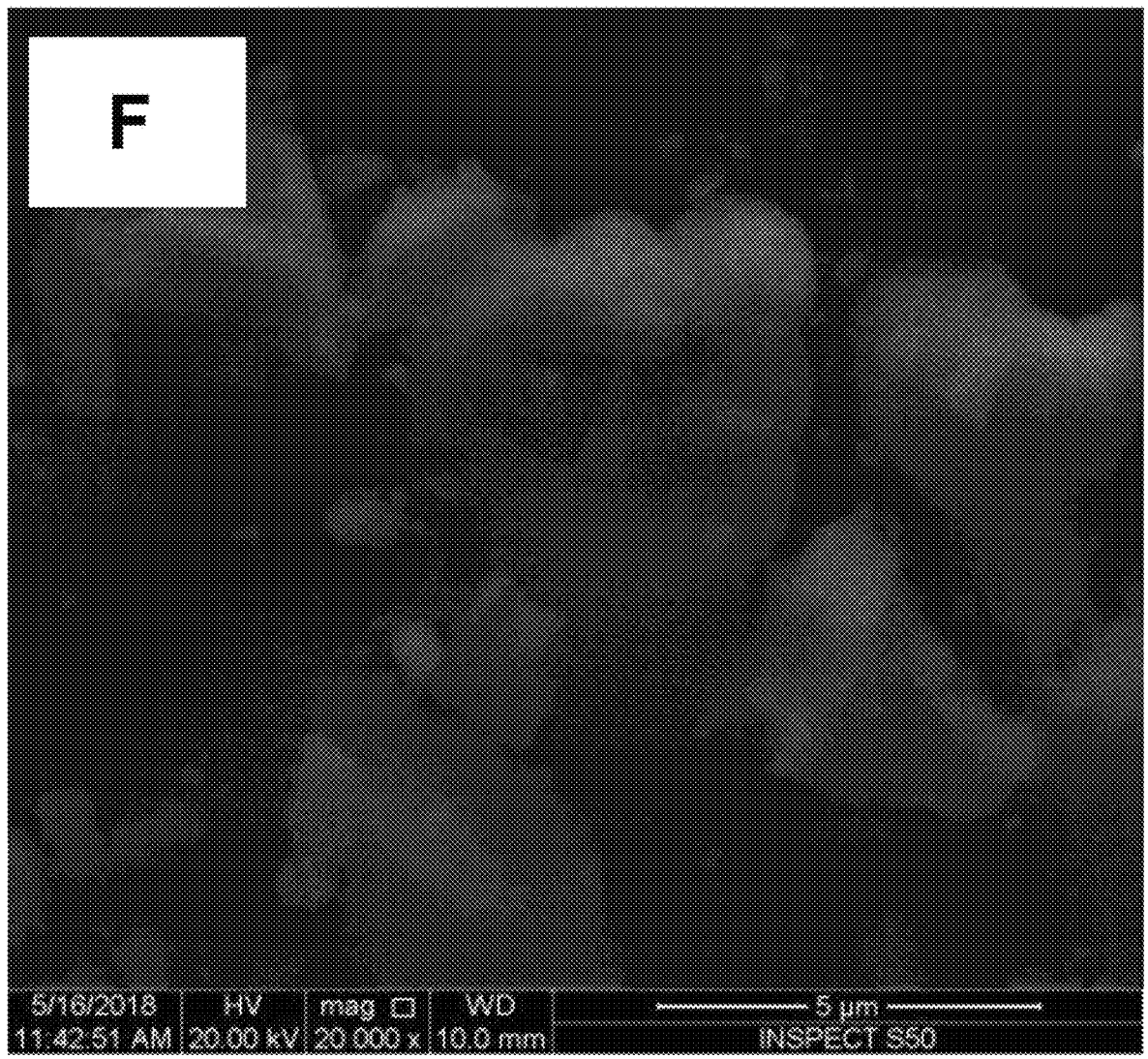
FIG. 3F shows a corresponding SEM-BSE image of PETZ 0.75 and PETZ 1.0.
Figure 3G:
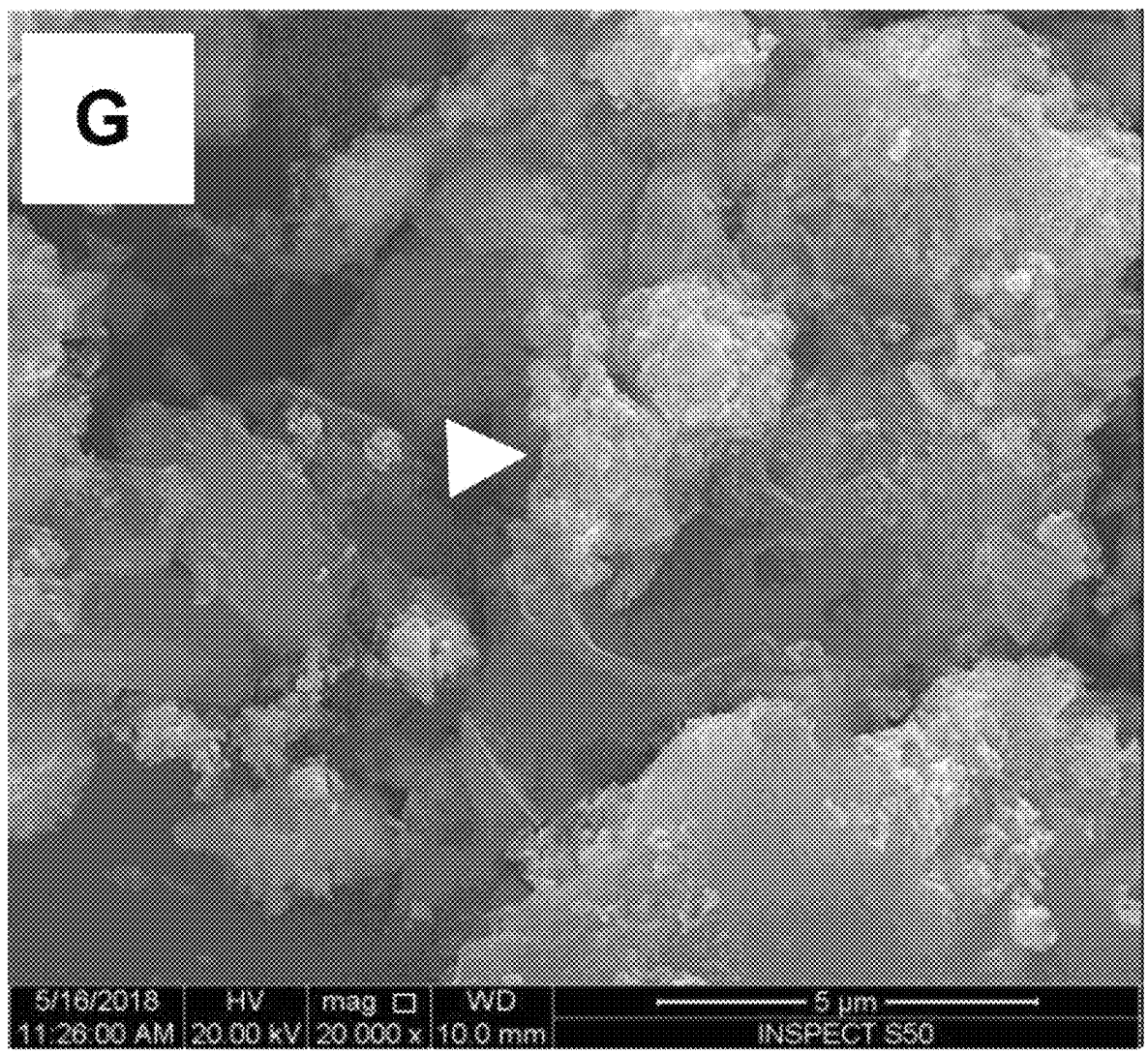
FIG. 3G shows an SEM-SE image at 20k-× magnification of PETZ 1.0.
Figure 3H:
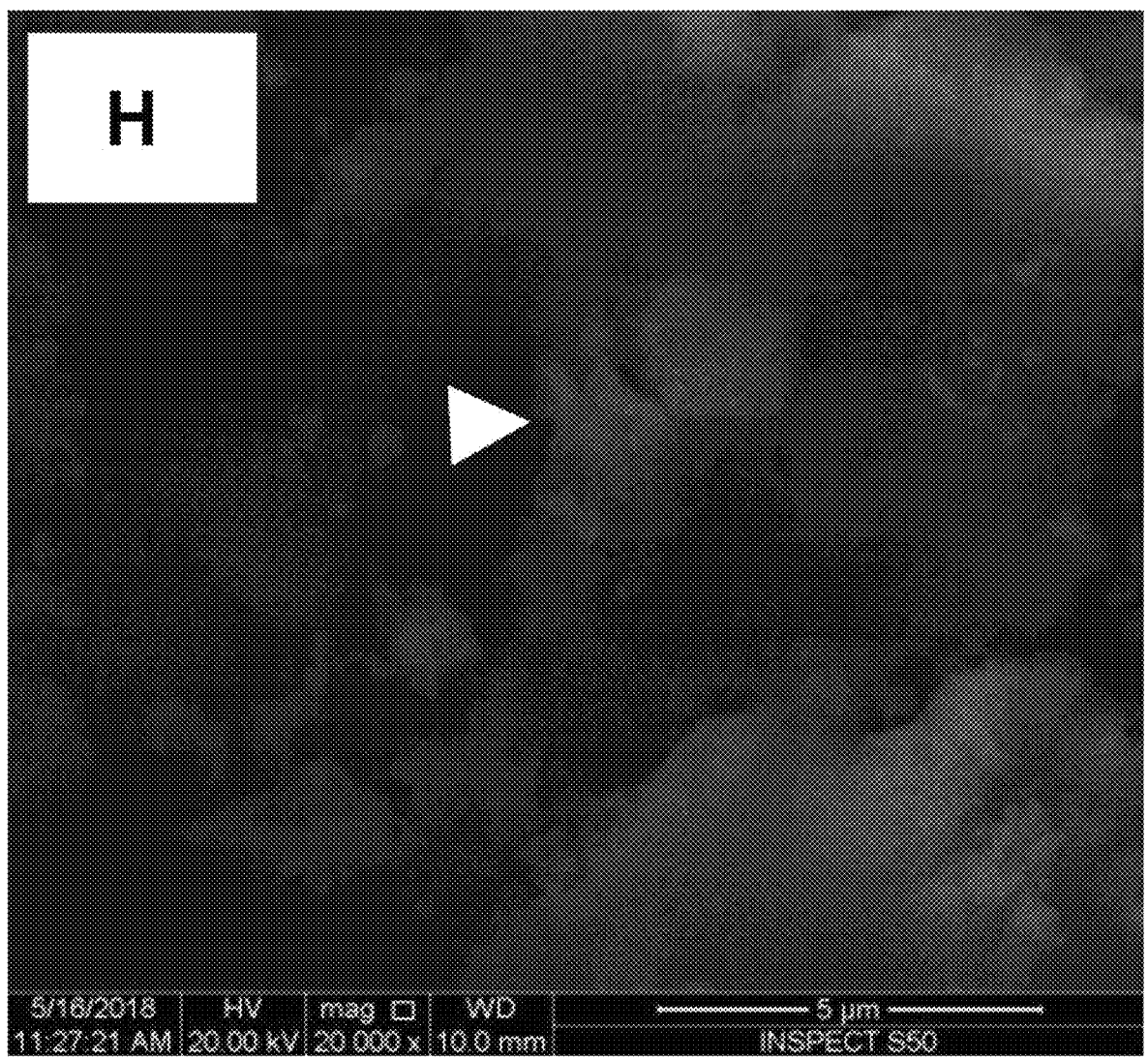
FIG. 3H shows a corresponding SEM-BSE image of PETZ 1.0.
Figure 4A:
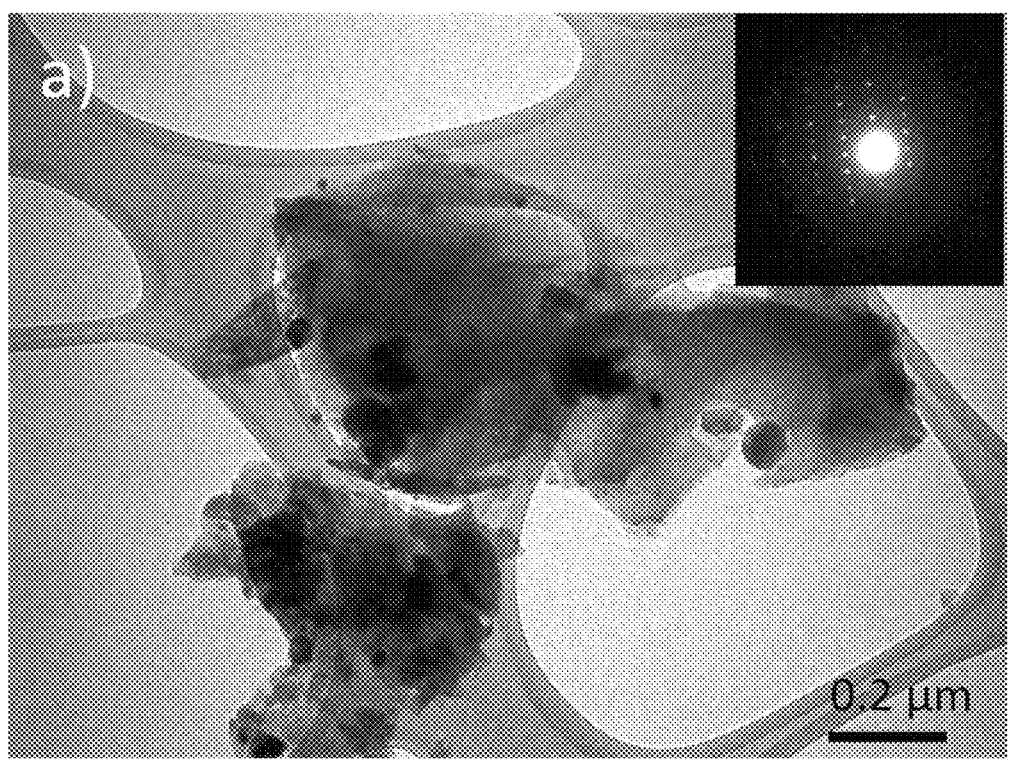
FIG. 4A shows a transmission electron microscope (TEM) overview micrograph along with an inset electron diffraction pattern of PETZ 0.1.
Figure 4B:
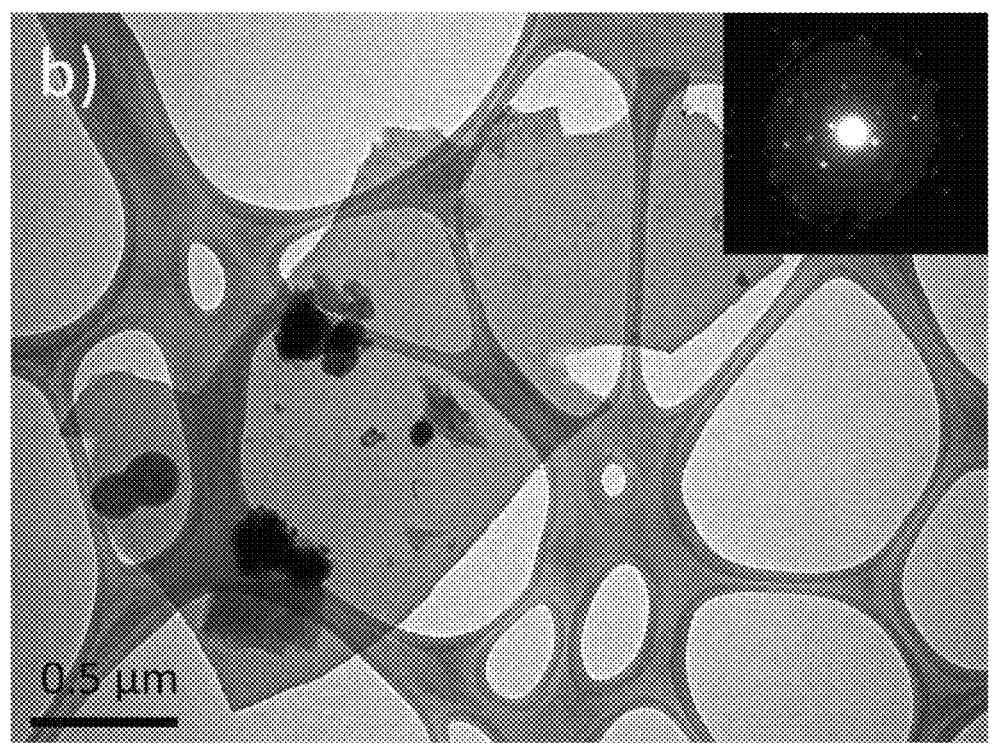
FIG. 4B shows a TEM overview micrograph along with an inset electron diffraction pattern of PETZ 0.5.
Figure 4C:
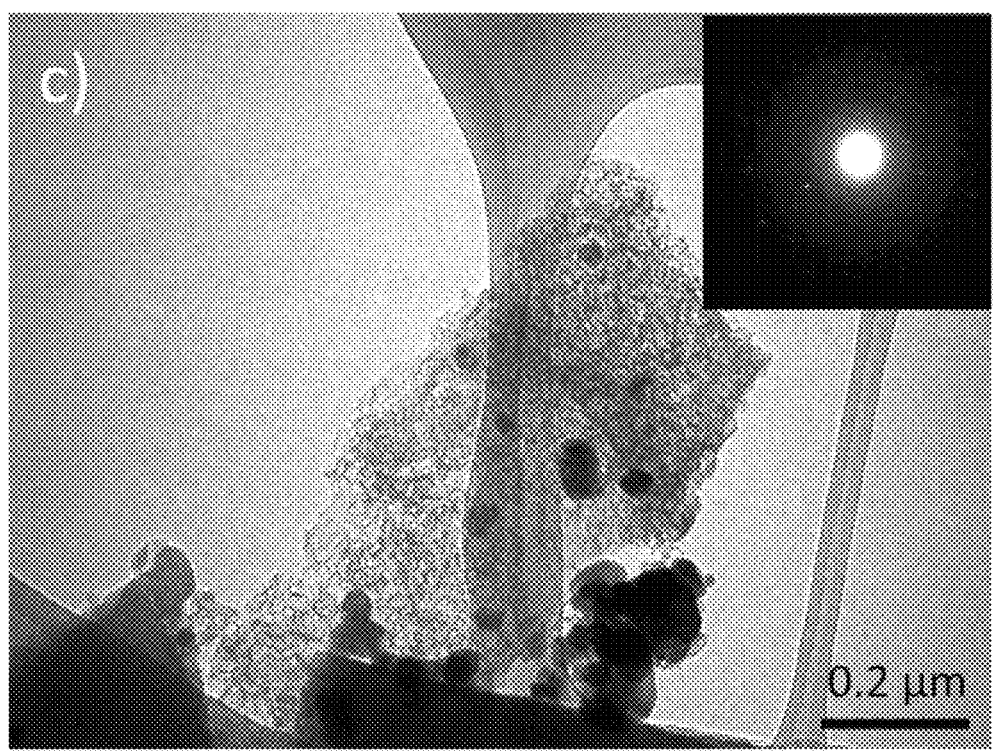
FIG. 4C shows a TEM overview micrograph along with an inset electron diffraction pattern of PETZ 0.75.
Figure 4D:
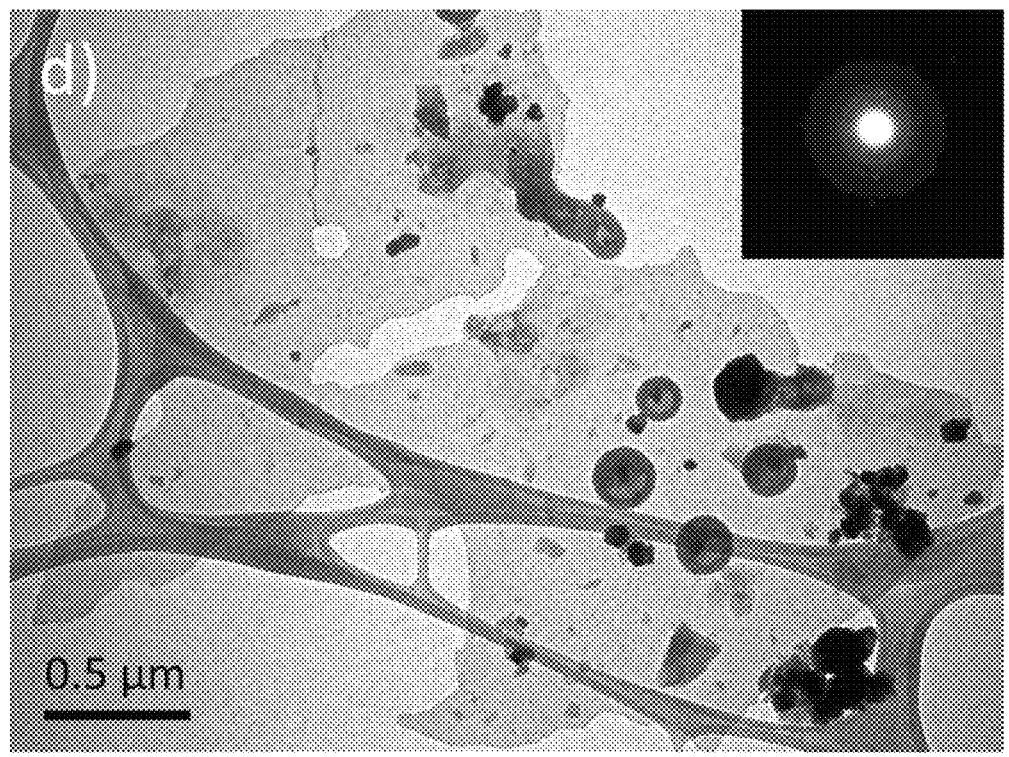
FIG. 4D shows a TEM overview micrograph along with an inset electron diffraction pattern of PETZ 1.0.

MATERIALS CHARACTERIZATION: FIG. 1 shows XRD patterns of raw polyethylene terephthalate (PET) bottle waste before thermal treatment (PET 0), the PET bottle waste after thermal treatment in the absence of Zn dust (PET 700), zinc dust before thermal treatment (Zn 0) and after thermal treatment at 700° C. (Zn 700), and the PET bottle waste after thermal treatment in the presence of 0.1 g (PETZ 0.1), 0.5 g (PETZ 0.5), 0.75 g (PETZ 0.75), or 1 g (PETZ 1.0) of Zn dust. FIG. 2 shows the overlayed Raman spectra of PET 0, PET 700, PETZ 0.1, PETZ 0.5, PETZ 0.75, and PETZ 1.0. FIG. 3 shows the scanning electron microscopy (SEM) images of PETZ 0.1, PETZ 0.5, PETZ 0.75, and PETZ 1.0. FIG. 4 shows the transmission electron microscopy (TEM) images of PETZ 0.1 (FIG. 4A), PETZ 0.5 (FIG. 4B), PETZ 0.75 (FIG. 4C), and PETZ 1.0 (FIG. 4D). FIG. 5A to 5F show TEM images of PET bottle waste material after pyrolysis in the absence or presence of Zn dust. FIG. 6 shows the thermogravimetric analysis (TGA) plots of PET 700, PETZ 0.1, PETZ 0.5, PETZ 0.75, and PETZ 1.0. FIG. 7A to 7E respectively show the nitrogen ($N_2$) adsorption-desorption measurements of PET 700, PETZ 0.1, PETZ 0.5, PETZ 0.75, and PETZ 1.0. The measured $N_2$ adsorption characteristic values of all samples are given in Table 1, below.

TABLE 1

$N_2$ adsorption-desorption characteristics of PET 700, PETZ 0.1, PETZ 0.5, PETZ 0.75 and PETZ 1.0.

| Sample | $S_{BET}$ (m$^2$/g) | Pore Volume (cm$^3$/g) | Average Pore Size (nm) |
|---|---|---|---|
| PET 700 | 589.5 | 0.165 | 18.47 |
| Zn 700 | 48.2 | 0.035 | 12.32 |
| PETZ 0.1 | 684.5 | 0.196 | 18.47 |
| PETZ 0.5 | 502.7 | 0.160 | 18.47 |
| PETZ 0.75 | 462.0 | 0.138 | 18.47 |
| PETZ 1.0 | 398.5 | 0.137 | 16.88 |

Figure 8A:
FIG. 8A shows UV-vis diffuse reflectance spectra of PET 700, PETZ 0.1, PETZ 0.5, and PETZ 1.0.
Figure 8B:
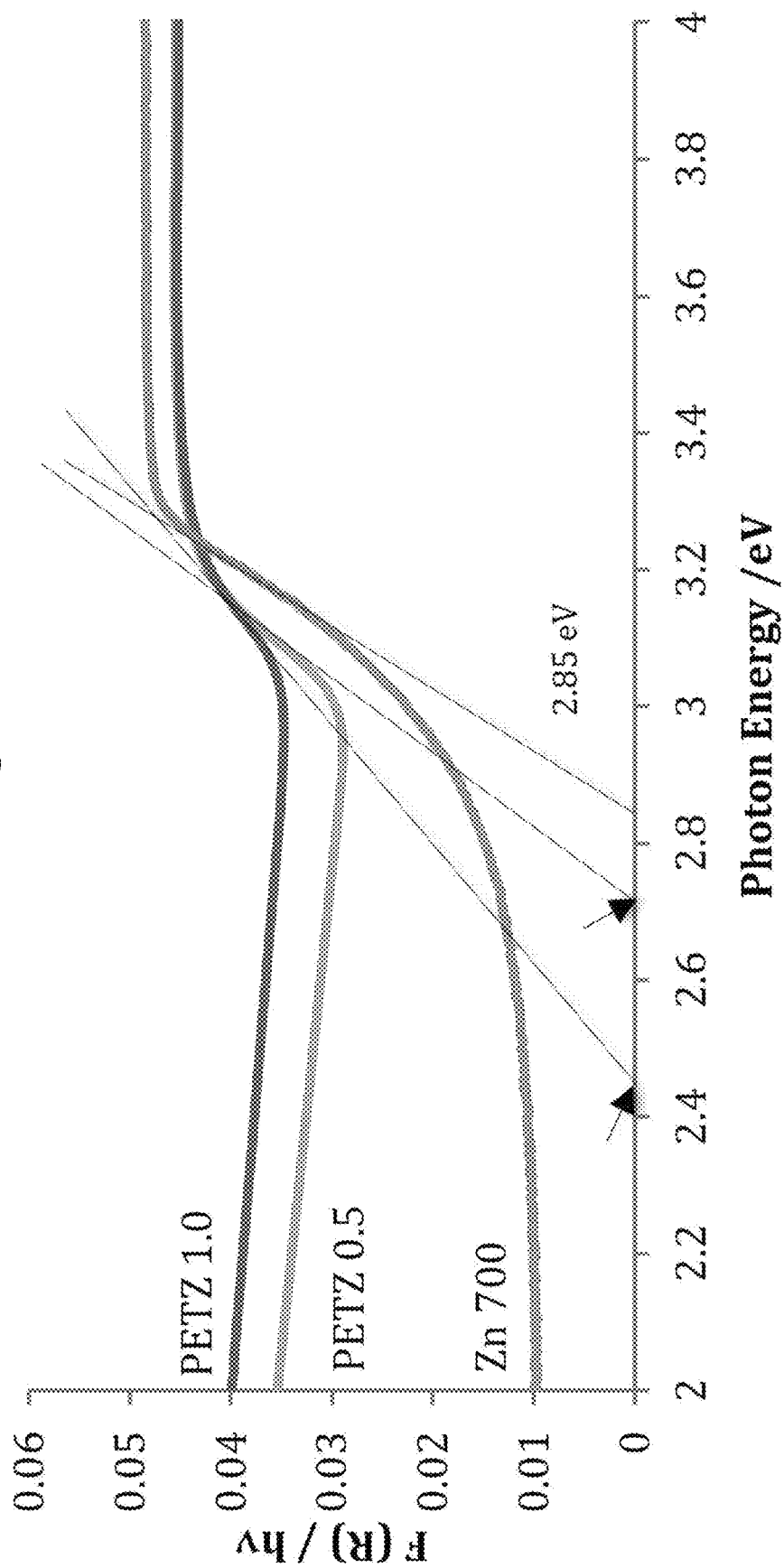
FIG. 8B shows plots of transformed Kubelka-Munk function versus the energy of light for Zn 0, PETZ 0.5, and PETZ 1.0.

The carbon materials produced as described herein exhibit surface areas up to 684.5 m$^2$/g, e.g., at least 375, 385, 400, 425, 450, 475, 500, 525, 550, 575, 600, 625, 650, 675, or 700 m$^2$/g and/or up to 800, 775, 750, 725, 700, 675, 650, 625, 600, 575, or 550 m$^2$/g, with mesoporous size distribution, such as 18.47 nm, e.g., at least 14, 15, 16, 16.5, 17, 17.5, 18, 18.25, or 18.5 nm and/or up to 22, 21.5, 21, 20.5, 20, 19.75, 19.5, 19.25, 19, 18.75, 18.5, 18.25, or 18 nm. Furthermore, the surface area and average pore volume decrease with increasing ZnO content in the samples, which can be explained by the blocking of the porous carbon surfaces by ZnO nanoparticles. FIG. 8A shows the UV-vis diffuse reflectance spectra of the samples of Zn 700, PET 700, PETZ 0.1, PETZ 0.5, and PETZ 1.0.

A proposed mechanism for the simultaneous transformation of plastic bottles and Zn dust into ZnO@graphite nanocomposite may be as indicated below in Equations 1.

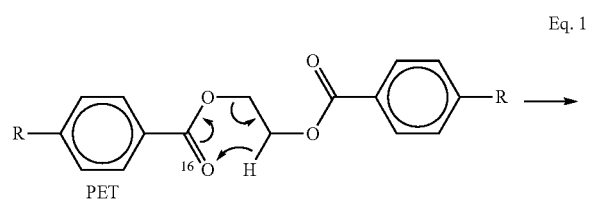

Eq. 1

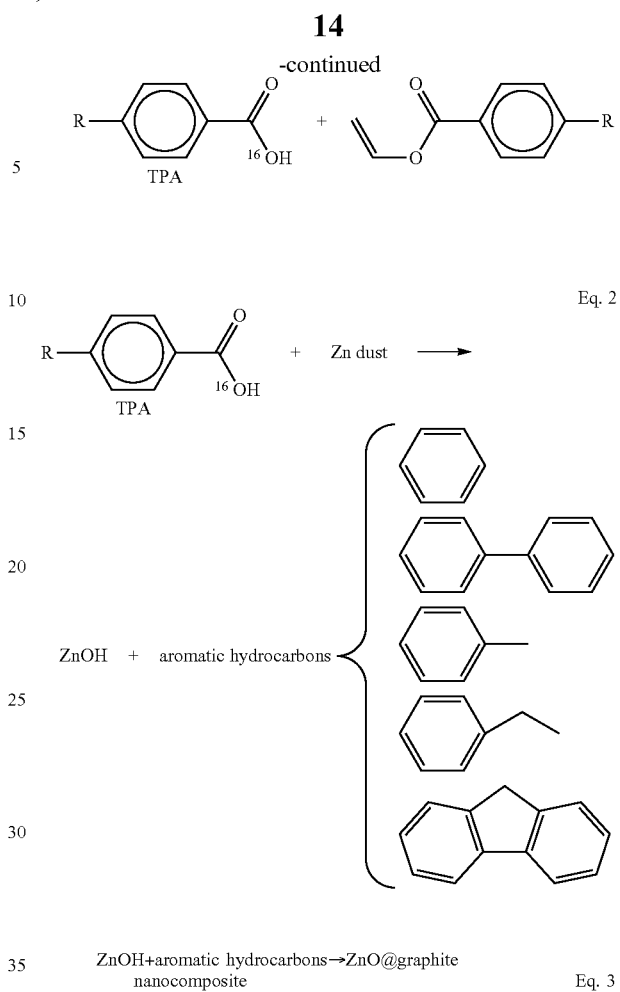

Eq. 2

ZnOH+aromatic hydrocarbons→ZnO@graphite nanocomposite

Eq. 3

Figure 10B:
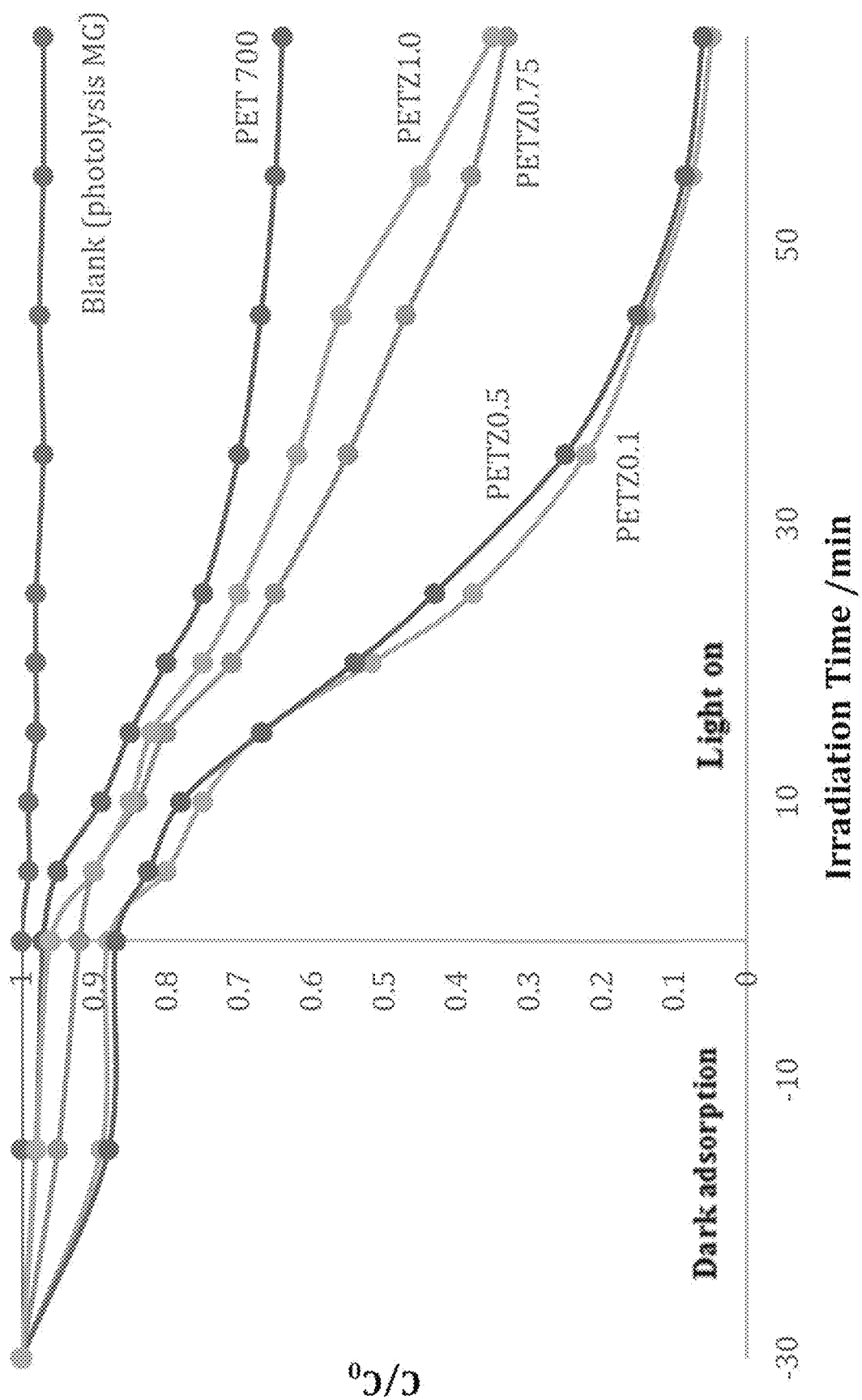
FIG. 10B shows the photocatalytic degradation efficiency of MG as the variation of C/C° with irradiation time in the presence of PET 700, PETZ 0.1, PETZ 0.5, PETZ 0.75, and PETZ 1.0.
Figure 11:
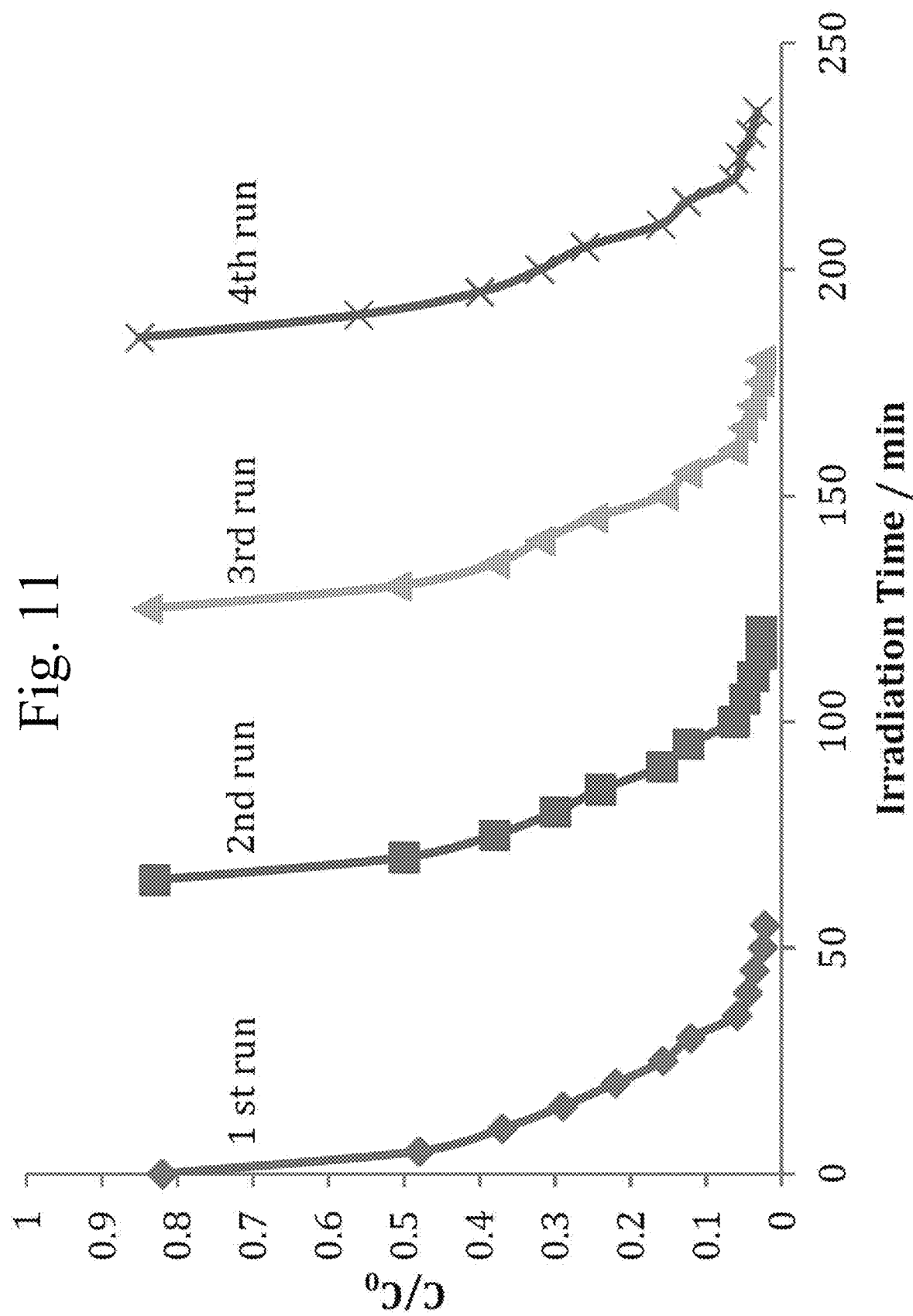
FIG. 11 shows plots comparing the recycle activity maintenance of PET 0.1 at 1 g/L for the photocatalytic degradation of 20 ppm methylene blue (MB), at pH 6.7.

PHOTOCATALYTIC PERFORMANCE: The photocatalytic activity of samples prepared as described herein were evaluated by following the degradation of methylene blue (MB) and malachite green (MG) dyes as model pollutants under UV light irradiation, as shown in FIGS. 9A and 10A. FIGS. 9A and 10A show the respective UV-Vis absorption spectra of an aqueous methylene blue (MB) or malachite green (MG) dye solution during the photocatalytic degradation over PET 700, PETZ 0.1, PETZ 0.5, PETZ 0.75, and PETZ 1.0 under UV light irradiation. FIGS. 9B and 10B show the respective degradation efficiencies of MB and MG based on the variation of C/C° with irradiation time in the presence of PET 700, PETZ 0.1, PETZ 0.5, PETZ 0.75 and PETZ 1.0. FIG. 11 shows the results of the recycle use of PET 0.1 (1 g/L) for the degradation of 20 ppm methylene blue (MB), at pH 6.7.

Referring now to the drawings, wherein like reference numerals designate identical or corresponding parts throughout the several views.

FIG. 1 shows XRD patterns of raw polyethylene terephthalate (PET) bottle waste before thermal treatment (PET 0), the PET bottle waste after thermal treatment in the absence of Zn dust (PET 700), zinc dust before thermal treatment (Zn 0) and after thermal treatment at 700° C. (Zn 700), and the PET bottle waste after thermal treatment in the presence of 0.1 g (PETZ 0.1), 0.5 g (PETZ 0.5), 0.75 g (PETZ 0.75), or 1 g (PETZ 1.0) of Zn dust. The XRD pattern of the raw PET bottle (PET 0) shows a characteristic peak of polyethylene terephthalate at 25.4°. The XRD pattern of the PET bottle material after thermal treatment in the absence of Zn dust, i.e., PET 700, shows an intense peak at 23.56° which can be indexed to the peak of graphitic structure of carbon and broad peak at 43°. The XRD pattern of zinc dust before thermal treatment, i.e., Zn 0, shows intense peaks at 36.42°, 39.14°, 43.34° and 54.42° correspond respectively to the [002], [100], [101], and lattice planes of the hexagonal Zn crystal (JCPDS card no. 65-3358). The XRD patterns of the PET bottle material after thermal treatment in the presence of varied amounts of (elemental) Zn dust, i.e., PETZ 0.1, PETZ 0.5, PETZ 0.75, and PETZ 1.0, show characteristic diffraction peaks at 31.8°, 34.4°, 36.3°, 47.5°, 56.6°, 62.9°, 66.6°, 68.1°, and 69.2°, which are respectively indexed to [100], [002], [101], [102], [110], [103], [200], [112], and crystal planes of the wurtzite-structure (JPCDS 36-1451) of ZnO, in addition to characteristic graphite peak at 23.56° with the disappearance of the peaks of Zn metal. These results indicate complete transformation of Zn particles into ZnO nanoparticles upon thermal treatment in the presence of plastic bottle. For comparison, the XRD pattern of Zn 700 (3rd from bottom) shows the characteristic diffraction peaks of the hexagonal Zn crystal structure, in addition to weak peaks at 31.8°, 34.4°, 47.5°, 56.6°, and 62.9° of the wurtzite-structure of ZnO indicating an incomplete transformation of Zn to ZnO in the absence PET bottle material. The XRD patterns show a concurrent transformation of PET bottle material into graphite and transformation of Zn into ZnO upon thermal treatment at 700° C. in an inert atmosphere.

FIG. 2 shows the overlayed Raman spectra of PET 0, PET 700, PETZ 0.1, PETZ 0.5, PETZ 0.75, and PETZ 1.0. The Raman spectrum of raw PET bottle material, PET 0, shows the typical Raman spectrum of polyethylene tetraphthalate (PET) with two strong characteristic bands at 1725 $cm^{-1}$, corresponding to the C=O stretching vibration, and 1613 $cm^{-1}$, corresponding to the benzene ring stretching vibration. The band at 1290 $cm^{-1}$ indicates the $CH_2$ wagging vibration and the asymmetric C—O—C stretching, the band at 858 $cm^{-1}$ corresponds to the ester bending mode, the band at 631 $cm^{-1}$ characteristic for aromatic esters, and the weak band at 1416 $cm^{-1}$ can be attributed to the aromatic ring C=C stretching vibration and —$OCH_2$— wagging vibration. Successful catalytic transformation of PET bottle waste material into porous graphite was further verified by Raman spectra. The Raman spectrum of PET bottle material after thermal treatment in the absence of Zn dust, PET 700, shows the characteristic D band at 1354 $cm^{-1}$ and G band at 1580 $cm^{-1}$ characteristic of graphitic carbon. The Raman spectra of PET bottle material after thermal treatment in the presence of different amounts of Zn dust, i.e., PETZ 0.1, PETZ 0.5, PETZ 0.75, and PETZ 1.0, each show the characteristic D and G band of graphitic carbon. The peaks at 437 cm-1, 339 $cm^{-1}$, and 588 $cm^{-1}$, which are characteristic of ZnO, appeared for PETZ 1.0. For the PETZ 0.1, PETZ 0.5, and PETZ 0.75 samples, the ZnO peaks are not predominant, which may owe to the smaller weight percents of ZnO in these samples.

FIG. 3 shows the scanning electron microscopy (SEM) images of the PET bottle waste after thermal treatment in the presence of different amounts of Zn dust, i.e., PETZ 0.1, PETZ 0.5, PETZ 0.75, and PETZ 1.0. The SEM images in FIGS. 3A, 3C, 3E, and 3G show the dense layers of carbon materials with accumulation of ZnO particles. Some carbon material in the structures exhibits a very thin appearance, denoted herein as carbon nanosheets (CNS). As seen in FIGS. 3B, 3D, 3F, and 3H, back-scattered electron (BSE) imaging, which is sensitive to atomic number, was also performed on the samples in order to identify the existence and distribution of ZnO particle within the CNS over the same areas as in FIGS. 3A, 3C, 3E, and 3G. The BSE micrographs indicate the presence of ZnO particles as Zn (atomic number of 30) scattered more electrons than carbon (atomic number of 6) due to Zn's higher atomic number, rendering Zn brighter than the carbon background. The BSE electronic micrographs in FIGS. 3B, 3D, 3F, and 3H reveal the distribution of ZnO particles in and/or on the carbon sheets. In FIGS. 3B, 3D, 3F, and 3H, the ZnO particles appear either as individual particles or group/clusters of several particles decorated on carbon sheets. Some of the sheets in FIG. 3A to 3H are highlighted by white arrows having ZnO particles at the tip of the white arrowheads in each case.

FIG. 4 shows the transmission electron microscopy (TEM) images of transformed PET-ZnO material at low magnification, i.e., PETZ 0.1 (FIG. 4A), PETZ 0.5 (FIG. 4B), PETZ 0.75 (FIG. 4C), and PETZ 1.0 (FIG. 4D), wherein the carbon sheets along with ZnO particles can be seen. The spots on the inset electron diffraction patterns demonstrate the crystalline nature of the products prepared as described herein, which is agrees with the XRD data shown in FIG. 1.

Figure 5A:
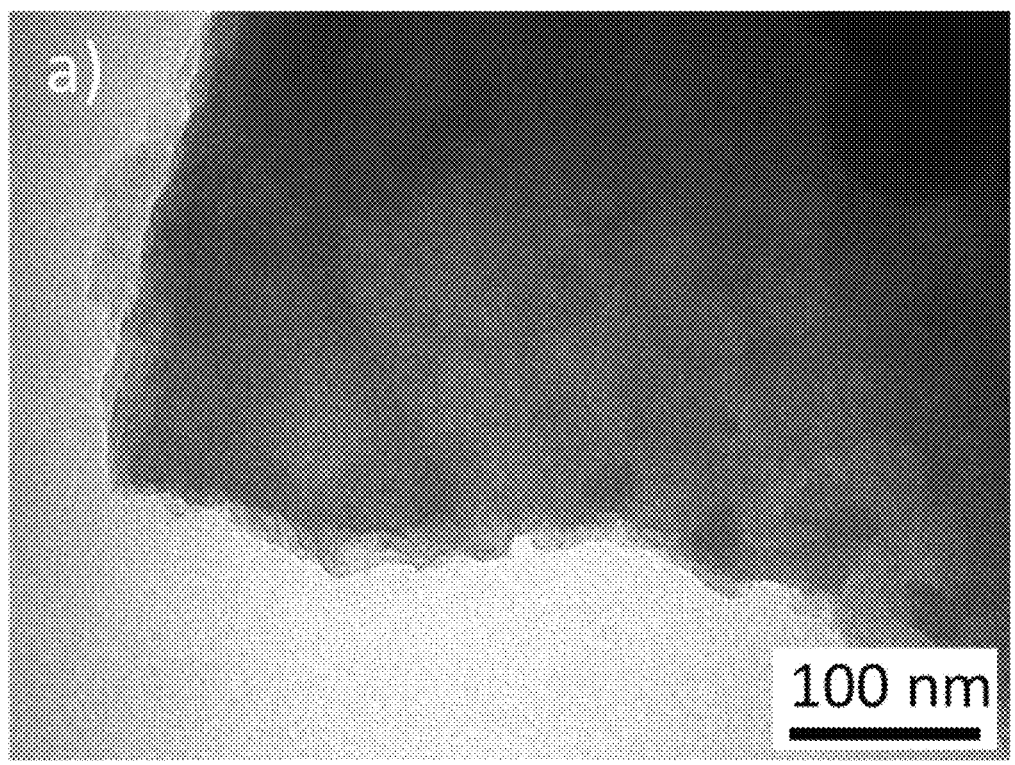
FIG. 5A shows a TEM image of PET 700, the scale bar corresponding to 100 nm.
Figure 5B:
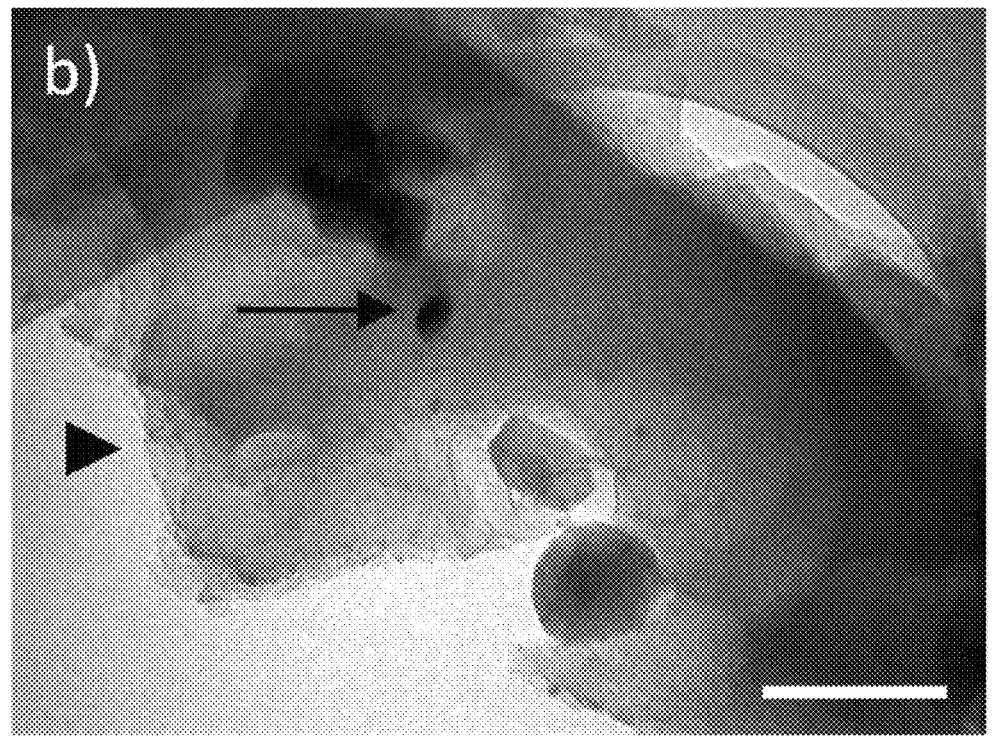
FIG. 5B shows a TEM image of PETZ 0.1, the scale bar corresponding to 100 nm.
Figure 5C:
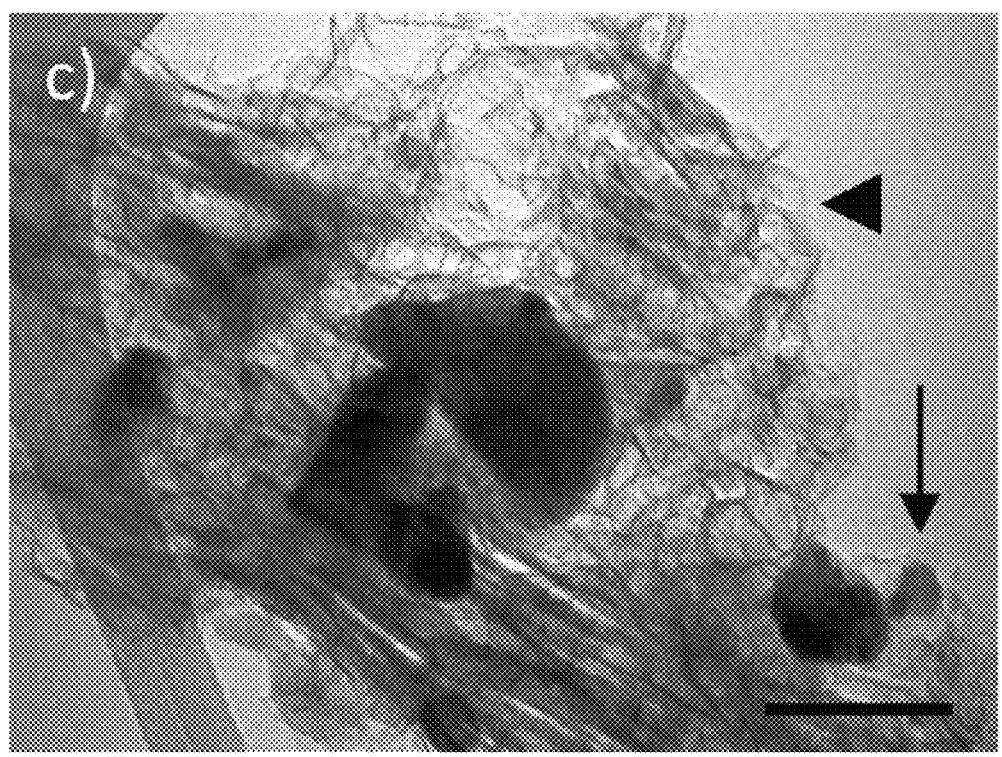
FIG. 5C shows a TEM image of PETZ 0.5, the scale bar corresponding to 100 nm.
Figure 5D:
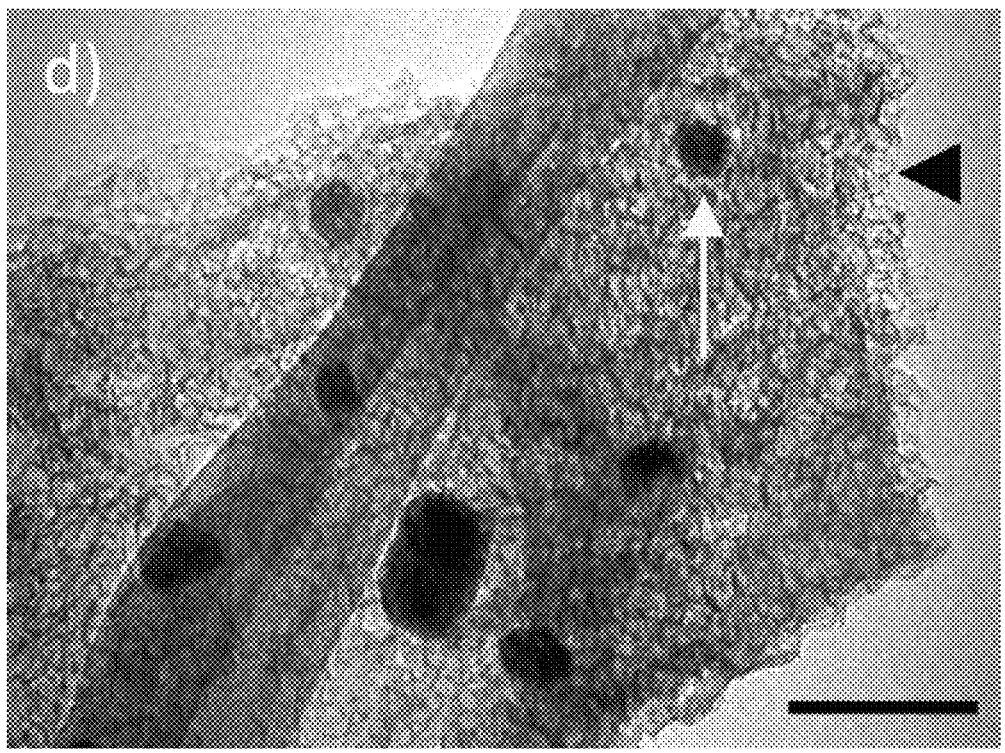
FIG. 5D shows a TEM image of PETZ 0.75, the scale bar corresponding to 100 nm.
Figure 5E:
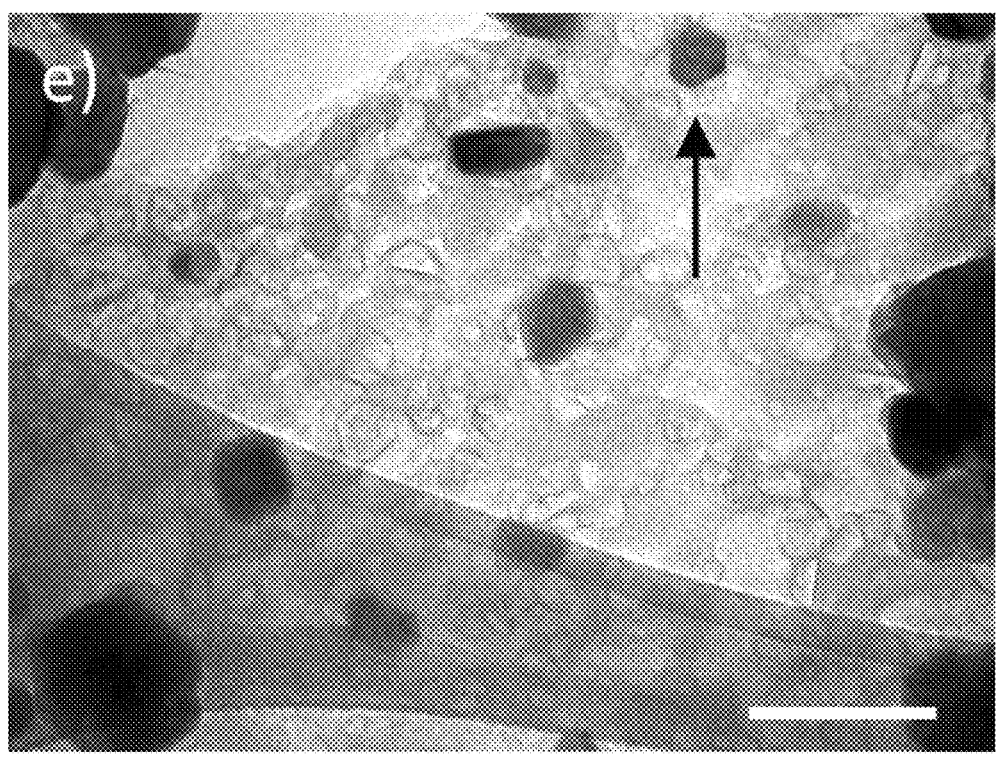
FIG. 5E shows a TEM image of PETZ 1.0, the scale bar corresponding to 100 nm.
Figure 5F:
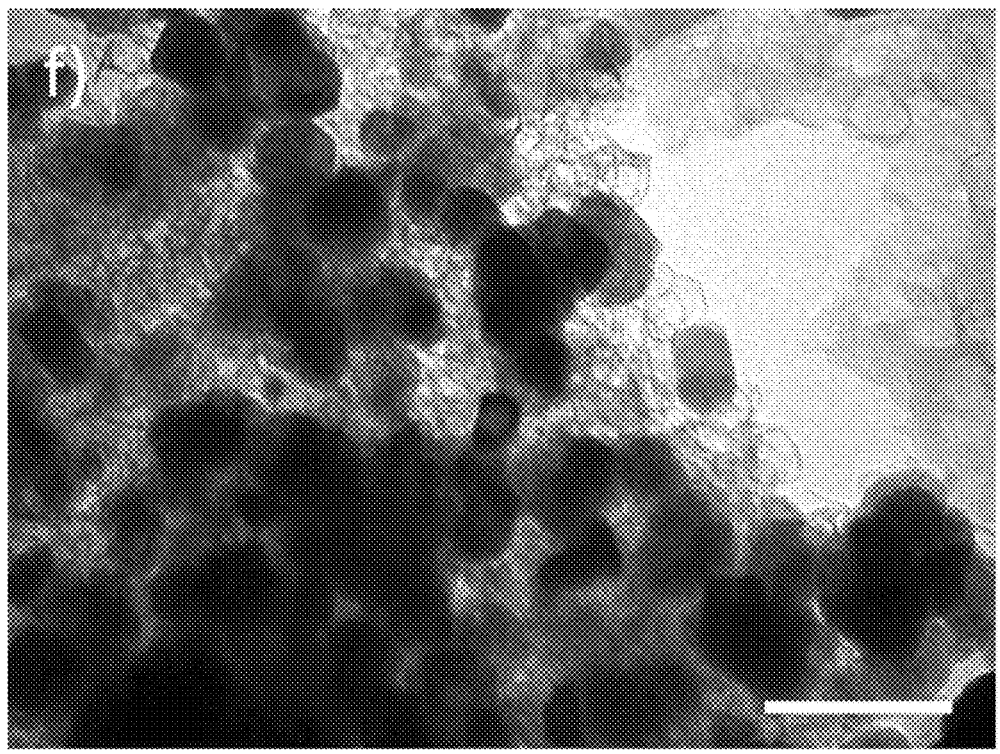
FIG. 5F shows another TEM image of PETZ 1.0 with the scale bar corresponding to 100 nm.
Figure 6:
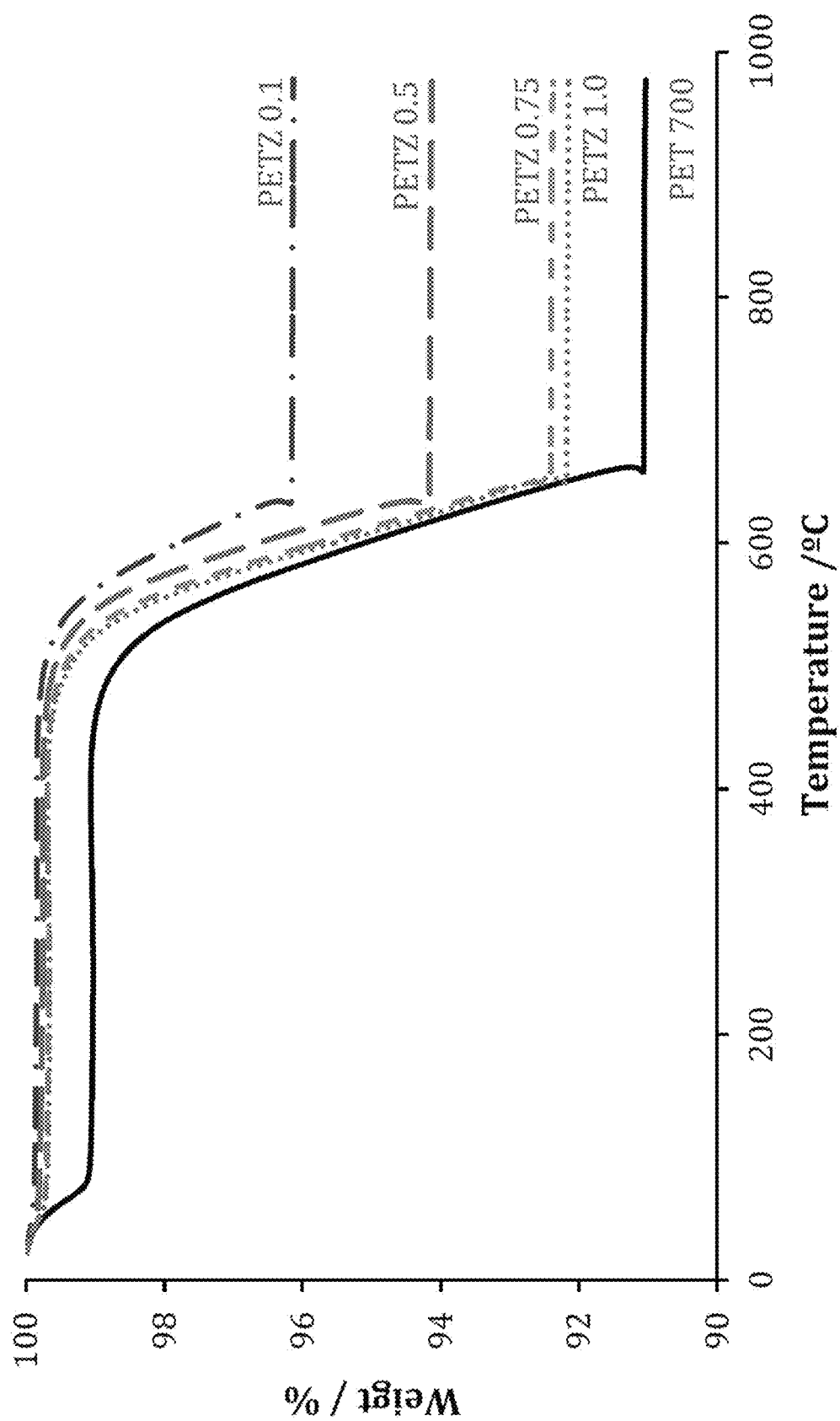
FIG. 6 shows thermogravimetric analysis (TGA) plots of plastic bottles after pyrolysis at 700° C. in inert atmosphere in the absence of Zn dust (PET 700) and in presence of Zn dust in varied amounts (PETZ 0.1, PETZ 0.5, PETZ 0.75 and PETZ 1.0)
Figure 7E:
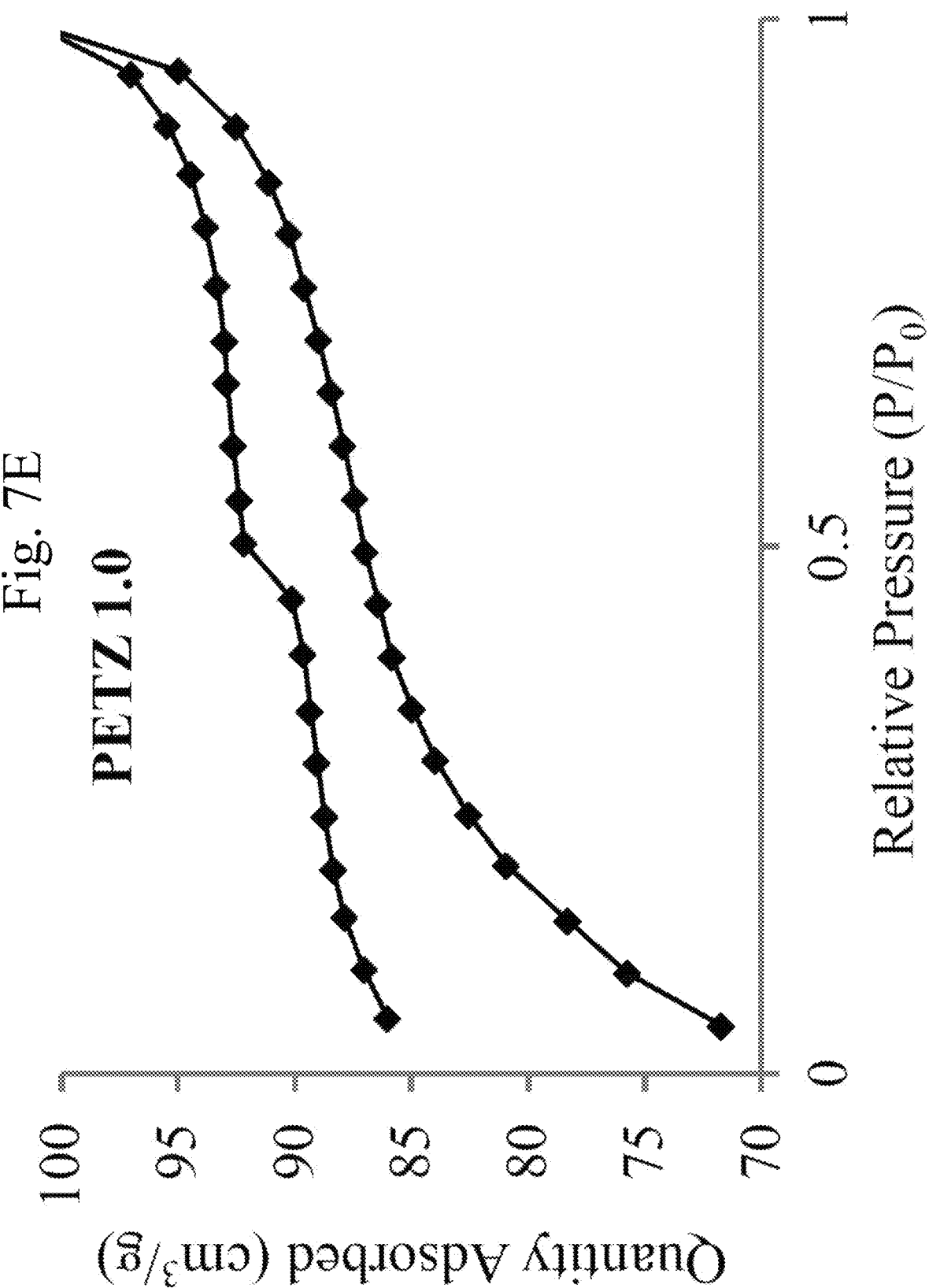

FIG. 5A to 5F show TEM images of PET bottle waste material after pyrolysis in the absence or presence of Zn dust and a scale (bar at bottom right) of 100 nm. FIG. 5A shows a TEM image of the sample PET bottle material after pyrolysis at 700° C. in inert atmosphere in the absence of Zn dust, i.e., PET 700. FIG. 5B shows a TEM image of the sample PET bottle material after pyrolysis at 700° C. in inert atmosphere in the presence of 0.1 g of Zn dust, i.e., PET 0.1. FIG. 5C shows a TEM image of the sample PET bottle material after pyrolysis at 700° C. in inert atmosphere in the presence of 0.5 g of Zn dust, i.e., PET 0.5. FIG. 5D shows a TEM image of the sample PET bottle material after pyrolysis at 700° C. in inert atmosphere in the presence of 0.75 g of Zn dust, i.e., PET 0.75. FIGS. 5E and 5F show TEM images of the sample PET bottle material after pyrolysis at 700° C. in inert atmosphere in the presence of 1 g of Zn dust, i.e., PET 1.0. In FIG. 5A to 5F, all scale bars correspond to 100 nm, and nanosheets are marked by arrows with arrowheads indicating ZnO particles in FIG. 5B to 5E.

The TEM images show that the carbon materials have 3D porous layers with gradient pore structures. The CNS prepared as described herein were much thinner than the carbon support used with TEM grid. ZnO particles can be observed decorating these CNS as highlighted by arrows in certain cases. The dimension of the ZnO particles can be observed to be less than 50 nm, e.g., at least 1, 2.5, 5, 10, 15, 20, or 25 nm and/or up to 75, 65, 50, 45, 40, 35, 30, or 25 nm in their longest average dimension. No obvious change in the morphology or porosity of the nanocomposites has been observed from the TEM measurements, based upon ZnO content. The number of ZnO particles increased with increasing added Zn-metal in the samples. TEM observation revealed the successful transformation of PET bottle waste material and Zn metal respectively into porous carbon sheets and crystalline spherical ZnO particles.

FIG. 6 shows the thermogravimetric analysis (TGA) plots for PET bottle waste material after thermal treatment in the absence of Zn dust (PET 700) and PET bottle after thermal treatment and in the presence of different amounts of Zn dust (PETZ 0.1, PETZ 0.5, PETZ 0.75, and PETZ 1.0). All samples show two stages of mass loss. The first stage of mass loss starts at 150° C. can be attributed to the loss of hydroxyl functional groups, epoxy functional groups, and water molecules. The second stage of mass loss, i.e., between 450° C. and 650° C., can be attributed to the pyrolysis of the remaining oxygen-containing groups and the formation of carbon rings. All curves confirm the stability of the graphitic structure up to 650° C. The sample weight losses were calculated to be 4% for PETZ 0.1, 6% for PETZ 0.5, 7.3% for PETZ 0.75, 7.6% for PETZ 1.0, and 8.94% for PET 700, indicating that the stability of the samples is in the order: PETZ 0.1>PETZ 0.5>PETZ 0.75>PETZ 1.0>PET 700, corresponding to the ZnO-to-graphite ratio in the samples.

FIG. 7A to 7E respectively show the nitrogen ($N_2$) adsorption-desorption measurements of PET 700, PETZ 0.1, PETZ 0.5, PETZ 0.75, and PETZ 1.0. The adsorption-desorption isotherms of all samples exhibit a mixture of IUPAC type I and type IV. A high adsorption of $N_2$ (over 90, 91, 92, 93, 94, 95, or 97.5%) under a relatively low or short pressure range, e.g., 0.1, 0.125, 0.14, 0.15, 0.175, or 0.2 $P/P_0$, is observed in FIG. 7A to 7E, perhaps most clearly in FIG. 7C, indicating the presence of mesopores with large pore size distribution.

FIG. 8A shows the UV-vis diffuse reflectance spectra of the samples of Zn 700, PET 700, PETZ 0.1, PETZ 0.5, and PETZ 1.0. The reflectance spectra of Zn 700 exhibit typical UV absorption of ZnO nanoparticles, with broad reflection in the visible region of the spectrum. The reflectance values were lower for ZnO@graphite samples, indicating high absorption of light and evidencing that graphite with ZnO extend the absorbance into visible region, i.e., 380 to 800 nm. As shown in FIG>8B, the band gap energy of all samples was estimated from the plot of transformed Kubelka-Munk function to be 2.85 eV for Zn 700, 2.75 eV for PETZ 0.5, and 2.5 eV for PETZ 1.0, evidencing the role of graphite in extending the light absorption to visible range. Bandgaps of inventive materials may be, for example, any of these and/or at least 2.25, 2.33, 2.4, 2.45, 2.55, 2.6, 2.67, 2.7, 2.75, 2.8, 2.85, or 2.9 eV and/or up to 3.25, 3.2, 3.15, 3.1, 3.05, 3, 2.95, 2.9, 2.85, 2.8, 2.75, 2.7, or 2.65 eV.

FIG. 9A shows the UV-Vis absorption spectra of an aqueous methylene blue (MB) dye solution obtained during the photocatalytic degradation over PET 700, PETZ 0.1, PETZ 0.5, PETZ 0.75, and PETZ 1.0 under UV light irradiation. The absorption peak at 665 nm for MB diminishes gradually with irradiation time and completely disappears after 60 minutes. Enhancement of the photocatalytic activity of ZnO@graphite composites from PET 0.1, PET 0.5, PET 0.75, to PET 1.0, can be attributed to the high electron pair separation achieved by the electronic interaction between ZnO and graphite and due to extensive $\pi$-$\pi$ conjugation system.

FIG. 9B shows the degradation efficiency of methylene blue (MB) according to the variation of $C/C°$ with irradiation time in the presence of PET 700, PETZ 0.1, PETZ 0.5, PETZ 0.75, and PETZ 1.0. PETZ 0.1 exhibits the highest photocatalytic activity amongst the other samples. At lower Zn concentration, i.e., PETZ 0.1, the ZnO particles appears to have higher particle distribution with higher surface, which corresponds to the TEM results and the BET surface area measurements reported herein.

FIG. 10A shows the UV-Vis absorption spectra of an aqueous MG dye solution obtained during the photocatalytic degradation over PET 700, PETZ 0.1, PETZ 0.5, PETZ 0.75, and PETZ 1.0 under UV light irradiation. The absorption peak at 635 nm for MG dye completely disappears within 70 minutes.

FIG. 10B shows the degradation efficiency of MG according to the variation of $C/C°$ with irradiation time in the presence of PET 700, PETZ 0.1, PETZ 0.5, PETZ 0.75, and PETZ 1.0. PETZ 0.1 again exhibits the highest photocatalytic activity amongst the other samples.

FIG. 11 shows an evaluation of the recyclability of an exemplary PETZ 0.1 (nano) composite from an environmental point of view. The recyclability was evaluated by carrying out the photocatalytic experiment four times using the same nanocomposite. After each run the nanocomposite particles were collected, washed by distilled water 3 times by centrifugation, then dried at 60° C. for 1 hour for the use in the next run. FIG. 11 shows the results of the recycle use of PET 0.1 (1 g/L) for the degradation of 20 ppm methylene blue (MB), at pH 6.7. The results in FIG. 11 indicate almost no change in the photocatalytic efficiency of the nanocomposite after the four-recycle use evidencing the excellent stability of the nanocomposite-based waste. The maintained efficiency of inventive materials after 3, 5, 10, 25, or 50 uses may be, for example, at least 75, 80, 85, 90, 92.5, 95, 97.5, 98, 99, 99.1, 99.5, or 99.9. % of the original catalytic activity. The amount of composite-to-organic compound weight ratio may be 10:1, 5:1, 2:1, 1:1, 1:2, 1:5, 1:10, 1:25, 1:50, 1:100, or 1:1000, whereby higher composite-to-organic compound weight ratios may be implemented in filter-type arrangements.

Numerous modifications and variations of the present invention are possible in light of the above teachings. It is therefore to be understood that within the scope of the appended claims, the invention may be practiced otherwise than as specifically described herein.

The invention claimed is:

1. A mesoporous particulate composition, comprising:
   graphite; and
   ZnO particles having an average diameter in a range of from 10 to 100 nm, in and/or on the graphite in a form of a mesoporous ZnO-graphite composite,
   wherein the mesoporous ZnO-graphite composite has a BET surface area in a range of from 395 to 750 $m^2$/g, and
   wherein the mesoporous ZnO-graphite composite has an average pore size in a range of from 15 to 20 nm,
   wherein the mesoporous ZnO-graphite composite has a BET surface area in a range of from 600 to 725 $m^2$/g, and
   wherein the mesoporous ZnO-graphite composite is in a form of porous particles having a gradient of porosity with greater porosity at an outer surface in comparison to a core.

2. The mesoporous particulate composition of claim 1, wherein the graphite and the ZnO particles are at least 90 wt. % of a total composition weight of the mesoporous particulate composition.

3. The mesoporous particulate composition of claim 1, wherein the graphite is present in an amount of from 35 to 95 wt. %, relative to a total composition weight of the mesoporous particulate composition, and/or
   wherein the ZnO particles are present in the composition an amount of from 5 to 65 wt . . . relative to the total composition weight of the mesoporous particulate composition.

4. The mesoporous particulate composition of claim 1, having a graphite-to-ZnO weight ratio in a range of from 1:1 to 5:1.

* * * * *